United States Patent
Korenaga et al.

(10) Patent No.: US 8,752,532 B2
(45) Date of Patent: Jun. 17, 2014

(54) INTERNAL COMBUSTION ENGINE AND CONTROL DEVICE FOR INTERNAL COMBUSTION ENGINE

(75) Inventors: Shingo Korenaga, Susono (JP); Shigeki Miyashita, Susono (JP); Hiroki Ito, Susono (JP); Yusuke Saitou, Susono (JP); Kouhei Kiyota, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 41 days.

(21) Appl. No.: 13/698,324

(22) PCT Filed: May 21, 2010

(86) PCT No.: PCT/JP2010/058598
§ 371 (c)(1),
(2), (4) Date: Nov. 16, 2012

(87) PCT Pub. No.: WO2011/145203
PCT Pub. Date: Nov. 24, 2011

(65) Prior Publication Data
US 2013/0061575 A1    Mar. 14, 2013

(51) Int. Cl.
*F01N 3/02* (2006.01)
*F02B 33/44* (2006.01)
*F02B 47/08* (2006.01)

(52) U.S. Cl.
USPC ......... 123/568.11; 60/287; 60/288; 60/605.2; 123/568.12

(58) Field of Classification Search
USPC .................. 60/286, 287, 288, 295, 605.2; 123/568.11, 568.12, 58.8, 315; 701/108
See application file for complete search history.

(56) References Cited

U.S. PATENT DOCUMENTS 5,517,976 A    5/1996    Baechle et al.
(Continued)

FOREIGN PATENT DOCUMENTS

| JP | 63 132865 | 8/1988 |
| JP | 7 54715 | 2/1995 |
| JP | 2002 523679 | 7/2002 |
| JP | 2003 506619 | 2/2003 |

OTHER PUBLICATIONS

International Search Report Issued Jun. 29, 2010 in PCT/JP10/58598 Filed May 21, 2010.

*Primary Examiner* — Kenneth Bomberg
*Assistant Examiner* — Dapinder Singh
(74) *Attorney, Agent, or Firm* — Oblon, Spivak, McClelland, Maier & Neustadt, L.L.P.

(57) ABSTRACT

This invention relates to an internal combustion engine and a control device for the internal combustion engine and has an object to provide an internal combustion engine and a control device therefore that can suppress occurrence of knocking if an EGR rate is increased. An EGR gas can be made to flow separately through one path via one EGR passage and an other path via another EGR passage. The EGR gas flow through the other path can be cooled by an intercooler. Since the intercooler usually has a capacity larger than that of an EGR cooler, its cooling capability is high, and the EGR gas can be made to flow into a surge tank in a state where heat of the EGR gas has been sufficiently emitted.

17 Claims, 20 Drawing Sheets

(56) References Cited

U.S. PATENT DOCUMENTS

| | | |
|---|---|---|
| 6,141,959 A | 11/2000 | Digeser et al. |
| 6,543,230 B1 * | 4/2003 | Schmid ........................ 60/605.2 |
| 6,752,132 B2 * | 6/2004 | Remmels et al. ......... 123/568.11 |
| 6,789,531 B1 | 9/2004 | Remmels |
| 6,953,030 B2 * | 10/2005 | Linderyd et al. ......... 123/568.12 |
| 7,011,080 B2 * | 3/2006 | Kennedy .................. 123/568.12 |
| 7,311,090 B2 * | 12/2007 | Lyons ....................... 123/568.11 |
| 7,490,466 B2 * | 2/2009 | Robel et al. ..................... 60/301 |
| 2011/0041495 A1 * | 2/2011 | Yager ........................... 60/605.2 |

\* cited by examiner

INTERNAL COMBUSTION ENGINE AND CONTROL DEVICE FOR INTERNAL COMBUSTION ENGINE

TECHNICAL FIELD

The present invention relates to an internal combustion engine and a control device therefor and more particularly to an internal combustion engine in which an exhaust recirculation passage is provided, which connects an exhaust passage and an intake passage of the internal combustion engine, and a control device thereof.

BACKGROUND ART

It is known that an internal combustion engine which employs an EGR (Exhaust Gas Recirculation) in order to improve exhaust emission has been provided. It is also known that the EGR can be applied to a supercharged internal combustion engine. As such internal combustion engine, Patent Literature 1, for example, discloses an internal combustion engine provided with an EGR passage which connects an exhaust passage of a specific cylinder in a plurality of cylinders and an intake passage on the downstream side of a supercharging compressor. In this internal combustion engine, since the EGR passage is configured as above, an exhaust gas only from the specific cylinder can be made to flow through the intake passage. Moreover, this internal combustion engine is further provided with a switching valve which opens the EGR passage and closes exhaust passages of the cylinders other than the specific cylinder at the same time and closes the EGR passage and opens the exhaust passages of the other cylinders at the same time. Therefore, the exhaust gas from the specific cylinder can be also made to flow through the exhaust passages of the other cylinders by operating the switching valve.

CITATION LIST

Patent Literature

Patent Literature 1: Japanese Utility Model Laid-Open No. 63-132865
Patent Literature 2: National Publication of International Patent Application No. 2003-506619

SUMMARY OF INVENTION

Problems to be Solved by the Invention

In an internal combustion engine, incidentally, further improvement of a fuel cost is expected. This also applies to an internal combustion engine which employs an EGR. If an EGR rate is increased, a cooling loss can be reduced whereby the fuel cost can be improved. In the Patent Literature 1, the EGR rate can be increased by operating the switching valve to the EGR passage side.

However, in a high load area of the internal combustion engine, if the EGR rate is increased, sufficient performances cannot be satisfied only with a radiation performance of engine cooling water, and then knocking of an Engine may occur. If knocking occurs, ignition timing cannot be advanced, and an exhaust temperature further rises and thus, a torque may drastically fall. If an intake air amount is further increased for the purpose of compensating the drop in the output, a fuel injection amount is also increased. Therefore, in the high load area of the internal combustion engine, if the EGR rate is increased, the fuel cost deteriorates.

The present invention was made to solve the above-described problems and it is an object to provide an internal combustion engine which can suppress occurrence of knocking if an EGR rate is increased and a control device thereof.

Means for Solving the Problem

A first aspect of the present invention, in order to achieve the above-described object, an internal combustion engine using at least one cylinder in a plurality of cylinders as an EGR exclusive cylinder, the internal combustion engine including:
an intercooler provided in an intake passage of the internal combustion engine;
an upstream-side EGR passage which connects an exhaust port of the EGR exclusive cylinder and the intake passage on the upstream of the intercooler; and
a downstream-side EGR passage which connects the exhaust port of the EGR exclusive cylinder and the intake passage on the downstream of the intercooler.

A second aspect of the present invention is the internal combustion engine according to the first aspect, wherein
lengths of the upstream-side EGR passage and the downstream-side EGR passage are designed such that, assuming that a path from the exhaust port to an intake port of the EGR exclusive cylinder via the upstream-side EGR passage is a first path and a path from the exhaust port to the intake port via the downstream-side EGR passage is a second path, a path difference between the first path and the second path generates a phase difference of 160° to 200° between the exhaust gas pulsation via the first path and the exhaust gas pulsation via the second path.

A third aspect of the present invention is the internal combustion engine according to the second aspect, wherein
the path difference is designed on the basis of a phase of the exhaust gas pulsation generated at the highest output revolution number of the internal combustion engine.

A forth aspect of the present invention is the internal combustion engine according to any one of the first to third aspects, further including:
a control valve provided in a branch portion branching into the upstream-side EGR passage and the downstream-side EGR passage and capable of changing a ratio between an exhaust gas made to flow through the upstream-side EGR passage and the exhaust gas made to flow through the downstream-side EGR passage by adjusting its opening degree.

A fifth aspect of the present invention is a control device for the internal combustion according to the fourth aspect, including:
engine load determining means for determining whether an engine load exceeds a predetermined high-load determination value or not; and
target opening-degree adjusting means for adjusting a target opening degree of the control valve so that the ratio of the exhaust gas made to flow through the upstream-side EGR passage side is increased when it is determined that the engine load exceeds the high-load determination value.

A sixth aspect of the present invention is the control device according to the fifth aspect, including:
cooling-water temperature acquiring means for acquiring a cooling water temperature of the internal combustion engine; and cooling-water temperature determining means for determining whether the cooling water temperature is higher than a predetermined excess-determination water temperature or not, wherein the target opening-degree adjusting means corrects the target opening degree so that the ratio of the exhaust gas made to flow through the upstream-side EGR passage side is further increased when it is determined that the cooling water temperature is higher than the excess-determination water temperature.

A seventh aspect of the present invention is the control device according to the fifth or sixth aspect, including:

load history acquiring means for acquiring a history of the engine load in a predetermined time;

excess time estimating means for estimating a cooling-water temperature excess time as time required until the cooling water temperature of the internal combustion engine exceeds a predetermined excess determination water temperature from the current temperature on the basis of the history of the engine load;

excess time comparing means for comparing a convergence delay period determined in advance as time required for convergence of the opening degree of the control valve and the cooling-water temperature excess time when it is determined that the engine load exceeds the high-load determination value; and EGR exclusive cylinder enriching means for enriching a fuel part in an air-fuel ratio of the EGR exclusive cylinder over the convergence delay period when the convergence delay period is longer than the cooling-water temperature excess time and for enriching the fuel part in the air-fuel ratio of the EGR exclusive cylinder over the cooling-water temperature excess time when the cooling-water temperature excess time is longer than the convergence delay period.

An eighth aspect of the present invention is the control device according to any one of the fifth to seventh aspects, including:

an EGR catalyst provided in the upstream-side EGR passage and capable of purifying an exhaust gas;

bed-temperature acquiring means for acquiring a bed temperature of the EGR catalyst; and bed-temperature determining means for determining whether the bed temperature is higher than a predetermined excess determination bed temperature or not, wherein the target opening-degree adjusting means corrects the target opening degree so that the ratio of the exhaust gas made to flow through the upstream-side EGR passage side is further increased when it is determined that the bed temperature is higher than the excess determination bed temperature.

A ninth aspect of the present invention is the control device according to any one of the fifth to eighth aspects, including:

an EGR catalyst provided in the upstream-side EGR passage and capable of purifying the exhaust gas;

load history acquiring means for acquiring a history of the engine load in a predetermined time;

bed-temperature excess time estimating means for estimating a bed-temperature excess time required until the bed temperature of the EGR catalyst exceeds a predetermined excess determination bed temperature from a current temperature on the basis of the history of the engine load;

excess time comparing means for comparing a convergence delay period determined in advance as time required for convergence of the opening degree of the control valve and the bed temperature excess time when it is determined that the engine load exceeds the high-load determination value; and EGR exclusive cylinder enriching means for enriching a fuel part in an air-fuel ratio of the EGR exclusive cylinder over the convergence delay period when the convergence delay period is longer than the bed temperature excess time and for enriching the fuel part in the air-fuel ratio of the EGR exclusive cylinder over the bed temperature excess time when the bed temperature excess time is longer than the convergence delay period.

A tenth aspect of the present invention is the control device according to the seventh of ninth aspect, wherein the EGR exclusive cylinder enriching means enriches the fuel part in the air-fuel ratio in the EGR exclusive cylinder and then, gradually decreases a degree of enriching.

An eleventh aspect of the present invention is the control device according to any one of the fifth to tenth aspects, further including other-cylinder enriching means which enriches a fuel part in an air-fuel ratio of cylinders other than the EGR exclusive cylinder and then, gradually decreases a degree of enriching when it is determined that the engine load exceeds the high-load determination value.

Advantageous Effects of Invention

According to the first aspect of the invention, the exhaust gas of the EGR exclusive cylinder can be made to flow through the intake passage whereby the EGR rate can be increased. Moreover, the exhaust gas from the EGR exclusive cylinder can be made to flow through the upstream-side EGR passage whereby the exhaust gas can be made to flow into the cylinder after being cooled by the intercooler. Therefore, the radiation performance of the engine cooling water can be compensated by the cooled gas and thus, occurrence of knocking can be suppressed even if the EGR rate is increased.

According to the second aspect of the invention, since the path difference between the first path and the second path is designed to generate a phase difference of 160° to 200° between the exhaust gas pulsation via the first path and the exhaust gas pulsation via the second path. If the amplitude of the synthesized wave can be made small, variation among the cylinders can be suppressed. The variation among the cylinders is, for example, an inflow of the exhaust gas of the EGR exclusive cylinder into only one of the cylinders. Therefore, occurrence of knocking in the cylinders can be equally suppressed.

According to the third aspect of the invention, the path difference between the first path and the second path can be designed by using the basis of the phase of exhaust pulsation generated at the highest output revolution number of the internal combustion engine as a standard phase. Therefore, the phase difference of 160° to 200° can be generated between the exhaust gas pulsation via the first path and the exhaust gas pulsation via the second path during the operation at the highest output revolution number which is a high revolution number in general.

According to the fourth aspect of the invention, the exhaust gas of the EGR exclusive cylinder can be made to flow separately by the control valve through the upstream-side EGR passage and the downstream-side EGR passage or to flow only through one of them.

According to the fifth invention, when it is determined that the engine load exceeds the predetermined high-load determination value, the exhaust gas of the EGR exclusive cylinder can be made to flow not only through the downstream-side EGR passage but also through the upstream-side EGR passage. Since the exhaust gas can be made to flow through the upstream-side EGR passage, the exhaust gas after being cooled by the intercooler can be made to flow into the cylinder. Therefore, the radiation performance of the engine cooling water can be ensured by the cooled exhaust gas whereby occurrence of knocking can be suppressed even if the EGR rate is increased.

According to the sixth aspect of the invention, when it is determined that the cooling water temperature of the internal combustion engine is higher than the predetermined excess determination water temperature, the target opening degree of the control valve can be corrected so that the ratio of the exhaust gas to be made to flow through the upstream-side EGR passage side can be further increased. Therefore, occurrence of knocking can be suppressed while the engine temperature is prevented from becoming higher than the excess determination water temperature.

According to the seventh aspect of the invention, the fuel part in the air-fuel ratio of the EGR exclusive cylinder can be enriched over the convergence delay period or cooling-water temperature excess time. A large quantity of hydrogen can be generated in the EGR exclusive cylinder by enriching the fuel part in the air-fuel ratio of the EGR exclusive cylinder. Since this hydrogen generation reaction is an endothermic reaction, the engine temperature can be lowered. By enriching the fuel part in the air-fuel ratio of the EGR exclusive cylinder, ignition performance of each cylinder can be improved and an engine temperature can be lowered and thus, occurrence of knocking can be favorably suppressed. Moreover, by enriching the fuel part in the air-fuel ratio over the convergence delay period or the cooling-water temperature excess time, the engine temperature is prevented from becoming higher than the excess determination water temperature during the convergence delay period or from becoming higher than the excess determination water temperature due to a rapid engine temperature rise.

According to the eighth aspect of the invention, when it is determined that the bed temperature of the EGR catalyst is higher than the predetermined excess determination bed temperature, the target opening degree of the control valve can be corrected so that the ratio of the exhaust gas to be made to flow through the upstream-side EGR passage side is further increased. Therefore, occurrence of knocking can be suppressed while the bed temperature of the EGR catalyst is prevented from becoming higher than the excess determination bed temperature.

According to the ninth aspect of the invention, the fuel part in the air-fuel ratio of the EGR exclusive cylinder can be enriched over the convergence delay period or the bed temperature excess time. As a result, the bed temperature of the EGR catalyst can be prevented from becoming higher than the excess temperature during the convergence delay period or the bed temperature of the EGR catalyst can be prevented from becoming higher than the excess determination bed temperature due to a rapid engine temperature rise.

According to the tenth aspect of the invention, after the fuel part in the air-fuel ratio of the EGR exclusive cylinder is enriched, the degree of enriching can be gradually decreased. Therefore, in the EGR exclusive cylinder, a difference in the air-fuel ratio which occurs in connection with the end of the fuel enriching can be reduced.

According to the eleventh aspect of the invention, when it is determined that the engine load exceeds the predetermined high-load determination value, the fuel part in the air-fuel ratio of the cylinders other than the EGR exclusive cylinder can be enriched, and then, the degree of enriching can be gradually decreased. Therefore, in the other cylinders, a difference in the air-fuel ratio which occurs in connection with the start of the fuel enriching can be reduced.

Figure 1:
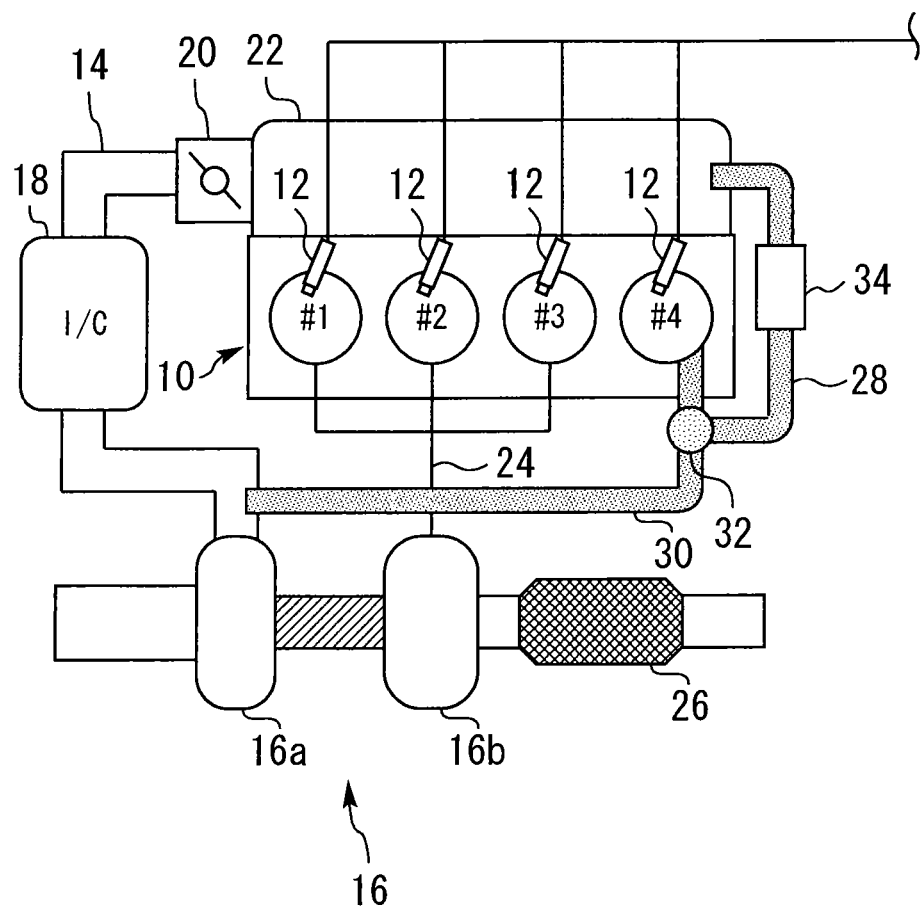
FIG. 1 is a diagram for explaining a system configuration of Embodiment 1.

REFERENCE SIGNS LIST 10 engine
12 injector
14 intake passage
16 turbo supercharger
16a compressor
16b turbine
18 intercooler
20 throttle valve
22 surge tank 24 exhaust passage
26 exhaust catalyst
28, 30 EGR passage
32 EGR valve
34 EGR cooler
36 EGR catalyst
50 crank angle sensor
52 water temperature sensor
54 bed temperature sensor
66 throttle sensor
60 ECU

DESCRIPTION OF EMBODIMENTS

Embodiments of the present invention will be described by referring to the attached drawings. Elements common in the figures are given the same reference numerals and duplicated explanation will be omitted. Moreover, numerals with the symbol "#" in the figures indicate cylinder numbers.

Embodiment 1

Configuration of Embodiment 1

First, Embodiment 1 of the present invention will be described by referring to FIGS. 1 to 10. FIG. 1 is a diagram for explaining a system configuration of Embodiment 1 of the present invention. The system of this embodiment is provided with an engine 10 as an internal combustion engine. The engine 10 is an in-line four-cylinder engine, and the ignition order is assumed to be #1->#3->#4->#2 cylinder. In each cylinder of the engine 10, an injector 12 for directly injecting a fuel into the cylinder is installed. Moreover, in each cylinder of the engine 10, an ignition plug (not shown) for igniting air-fuel mixture in the cylinder is installed.

In an intake passage 14 of the engine 10, a compressor 16a of a turbo supercharger 16 is installed. The turbo supercharger 16 is provided with a turbine 16b connected integrally to the compressor 16a. The turbine 16b is installed in an exhaust passage 24 which will be described later, and the compressor 16a is rotated and driven by exhaust energy of an exhaust gas inputted into the turbine 16b.

On the downstream of the compressor 16a, an intercooler 18 for cooling air supercharged by the compressor 16a is installed. The intercooler 18 may be of an air cooling type but is preferably a water cooling type which is high in cooling performance. On the further downstream of the intercooler 18, an electronically controlled throttle valve 20 is provided. Intake air having passed through the throttle valve 20 passes through a surge tank 22 and flows into each cylinder of the engine 10.

In the cylinders of the engine 10, exhaust ports (not shown) of #1 to #3 cylinders are connected to an exhaust passage 24. In the exhaust passage 24, the turbine 16b is installed as described above. Moreover, in the exhaust passage 24 on the downstream of the turbine 16b, an exhaust catalyst 26 for purifying the exhaust gas is installed. On the other hand, an exhaust port (not shown) of the #4 cylinder of the engine 10 is connected to the surge tank 22 through an EGR passage 28 and also connected to the intake passage 14 closer to the upstream side than the intercooler 18 through an EGR passage 30. That is, the exhaust gas in the #4 cylinder of the engine 10 flows, unlike the exhaust gas in the #1 to #3 cylinders, through two passages, that is, the EGR passages 28 and 30, and is recirculated to an intake system such as the surge tank 22. In the explanation below, the exhaust gas from the #4 cylinder of the engine 10 is also referred to as "EGR gas."

At a spot where the EGR passage 28 branches from the EGR passage 30, an EGR valve 32 is installed. The EGR valve 32 is composed of an electromagnetic valve and the like capable of adjusting an opening degree. By adjusting the opening degree of the EGR valve 32, a ratio of the EGR gas to be made to flow through the EGR passages 28 and 30 can be changed. In the EGR passage 28, an EGR cooler 34 using cooling water flowing through the engine 10 is provided. The EGR gas flowing through the EGR passage 28 is cooled by the EGR cooler 34.

Figure 2:
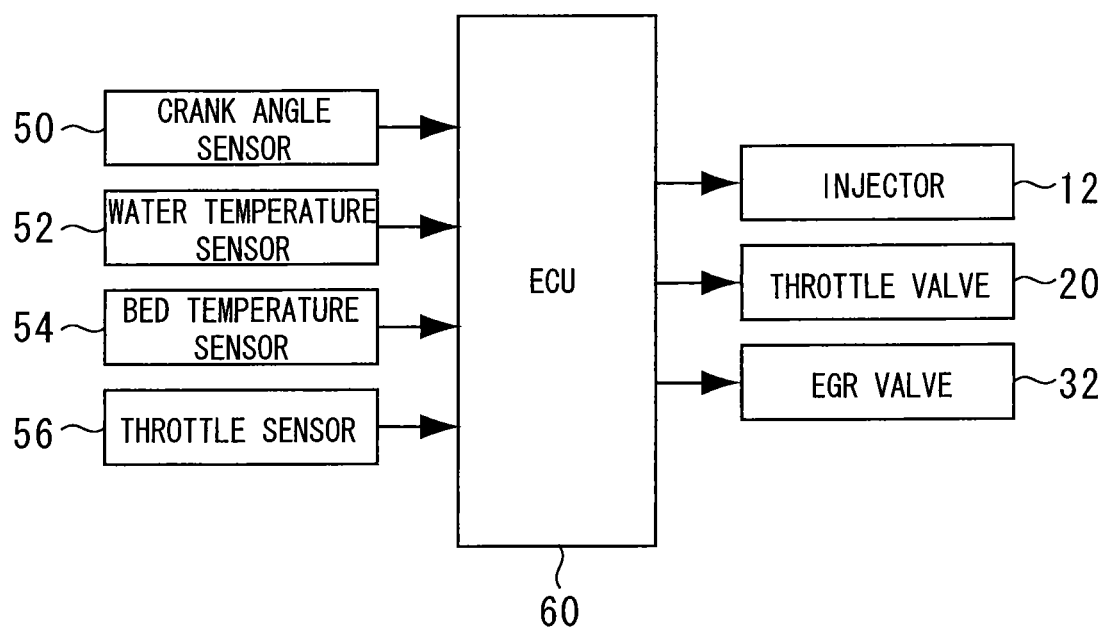
FIG. 2 is a diagram for explaining a control system of an engine 10.

Subsequently, a control system of the engine 10 will be described by referring to FIG. 2. FIG. 2 is a configuration diagram illustrating the control system of the system in this embodiment. As illustrated in FIG. 2, the system of this embodiment is provided with a sensor system including a plurality of sensors 50 to 56 and an ECU (Electronic Control Unit) 60 for controlling an operation state of the engine 10.

First, the sensor system will be described. A crank angle sensor 50 outputs a signal synchronized with rotation of a crank shaft of the engine 10. The ECU 60 can detect an engine revolution number NE and a crank angle CA on the basis of an output of the crank angle sensor 50. A water temperature sensor 52 detects an engine cooling-water temperature Tw. An EGR bed temperature sensor 54 detects a bed temperature Tc of an EGR catalyst 36 in Embodiment 2 which will be described later. A throttle sensor 56 detects a throttle opening degree TA which is an opening degree of the throttle valve 20.

The sensor system further includes various sensors (an air-fuel ratio sensor for detecting an exhaust air-fuel ratio, an accelerator opening-degree sensor for detecting an accelerator opening-degree and the like, for example) required for control of a vehicle and the engine 10 in addition to the above-described sensors 50 to 56. These sensors are connected to an input side of the ECU 60.

On the other hand, on an output side of the ECU 60, various actuators including the injector 12, the throttle valve 20, the EGR valve 32 and the like are connected. The ECU 60 detects operation information of the engine 10 through the sensor system and drives each of the actuators on the basis of the detection result so as to control the operation. Basically, the engine revolution number NE and the crank angle CA are detected on the basis of an output of the crank angle sensor 50, and while air-fuel ratio feedback control, which will be described later, is being executed, ignition timing is determined on the basis of the crank angle CA, and the ignition plug is driven.

(Air-fuel Ratio Feedback Control)

One of operation control by the ECU 60 is the air-fuel ratio feedback control. The air-fuel ratio feedback control is feedback control of the air-fuel ratio so that the exhaust air-fuel ratio becomes a target air-fuel ratio by correcting a fuel injection amount in accordance with the output of the air-fuel ratio sensor. The target air-fuel ratio here is a target value of the air-fuel ratio variably set in accordance with the operation state and the like of the engine 10. According to the air-fuel ratio feedback control, the exhaust air-fuel ratio can be kept within a predetermined air-fuel ratio range (purification window) in which a purification capacity of the exhaust catalyst 26 is exerted, and purification efficiency of the exhaust gas by the exhaust catalyst 26 can be improved. The #1 to #4 cylinders of the engine 10 are under this air-fuel ratio feedback control during normal time.

Characteristics of Embodiment 1

Since the engine 10 is a four-cylinder engine, the EGR gas corresponds to 25% of the exhaust gas of all the cylinders.

Thus, according to the configuration of this embodiment, the large quantity of the exhaust gas of 25% all the time can be recirculated to the surge tank 22 regardless of the operation state of the engine 10. As a result, the combustion temperature can be further lowered in any operation state of the engine 10, and reduction of a cooling loss can be further promoted, whereby further improvement of the fuel cost can be expected.

Figure 3:
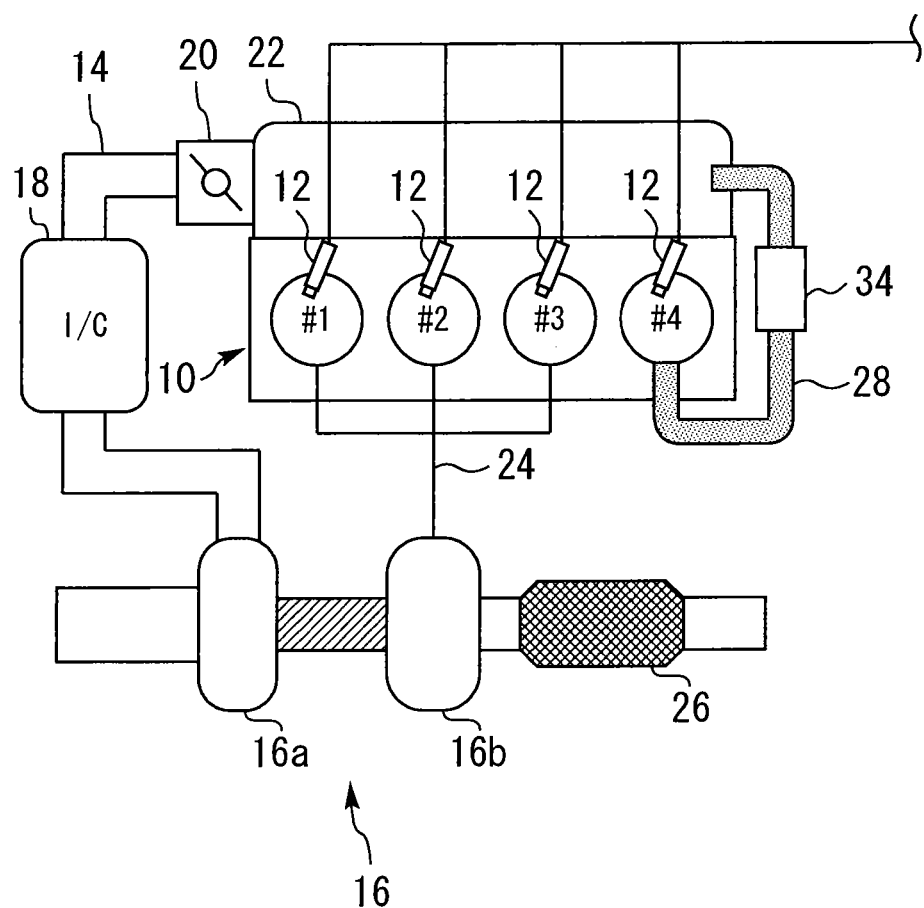
FIG. 3 is another system configuration diagram as a comparative example of system configuration of Embodiment 1.

As another system which can realize the large-quantity EGR as above, a system illustrated in FIG. 3 can be cited. However, with the system illustrated in FIG. 3, if the large-quantity EGR is to be realized in a high load area (large throttle opening degree), sufficient performance cannot be satisfied only by the radiation performance Qw of engine cooling water, and a problem of occurrence of knocking is caused. This problem will be described by using FIG. 4.

Figure 4:
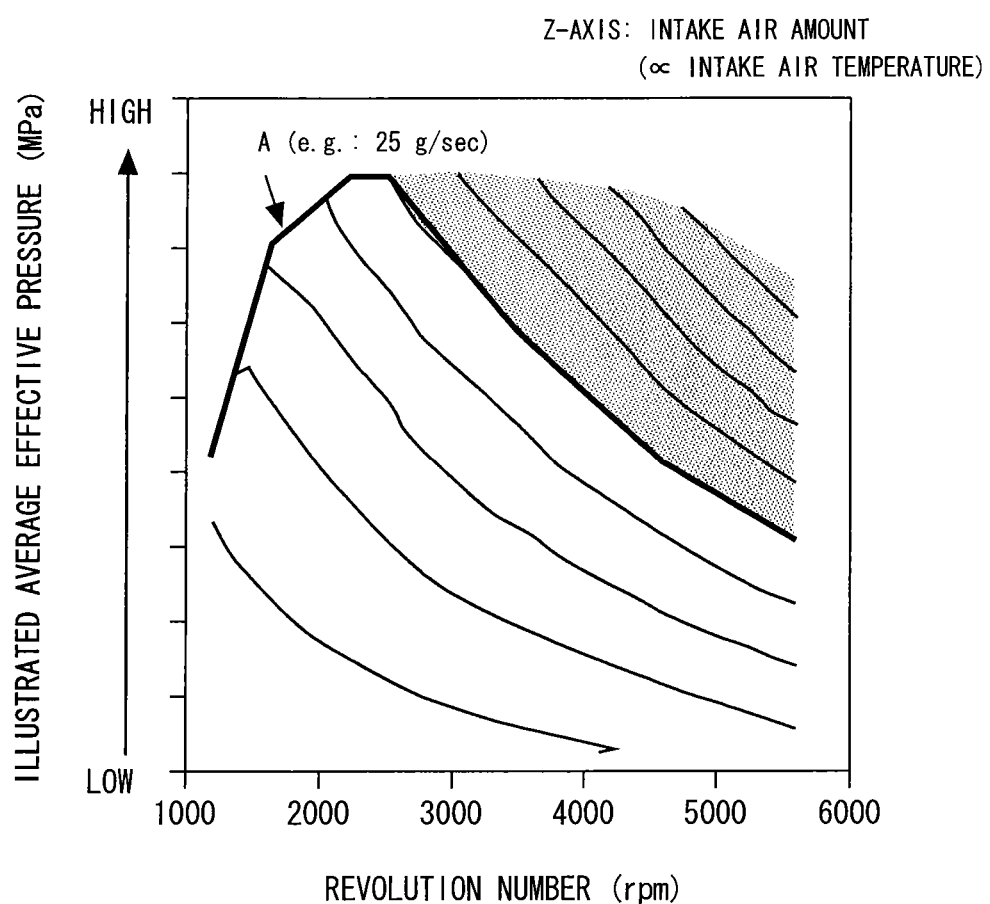
FIG. 4 is a diagram illustrating a change of an engine cooling water temperature Tw if an intake air amount (g/sec) and an engine revolution number NE are changed.

FIG. 4 is a diagram illustrating a change of an intake air amount (g/sec) with respect to an engine revolution number NE (rpm) and an illustrated average effective pressure (MPa). In FIG. 4, when seen at the same illustrated average effective pressure, the intake air amount can remain small even if the engine revolution number NE is shifted from a low revolution number side to a high revolution number side in an area in which this illustrated average effective pressure is low (low load area). On the other hand, in an area in which the illustrated average effective pressure is high (high load area), the intake air amount is already large on the low revolution number side and becomes larger with the high revolution number. Here, in the system illustrated in FIG. 3, the larger the intake air amount becomes, the more the EGR gas amount increases, and the more the EGR gas amount increases, the higher the intake air temperature containing it rises. Thus, in an area requiring an intake air amount exceeding a regulated value (a bold line A in FIG. 4), for example, the sufficient performance cannot be satisfied only by the radiation performance Qw of the engine cooling water, and knocking occurs.

In order to prevent occurrence of knocking, control for stopping the EGR in the high load area is executed in a usual engine. However, in the system in FIG. 3, the EGR gas cannot be stopped in the high load area due to its structure. Alternatively, in the system in FIG. 3, control for delaying the ignition timing can be executed. However, if the ignition timing is delayed, the exhaust temperature further rises, and the ignition timing should be further delayed, which results in drastic drop in a torque.

Figure 5:
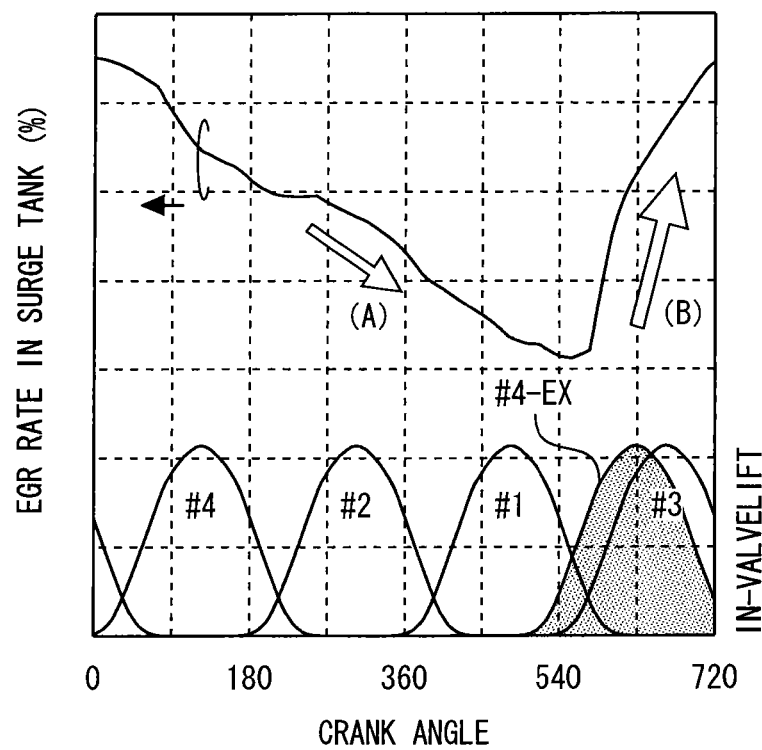
FIG. 5 is a diagram illustrating a change of a ratio of an EGR gas in a surge tank 22 at each crank angle CA.

Moreover, in the system in FIG. 3, if the ignition order is set as #1->#3->#4->#2, it causes a problem that a difference is generated in the EGR gas amounts flowing into the cylinders. This problem will be described by using FIG. 5. FIG. 5 is a diagram illustrating a change of a ratio of the EGR gas in the surge tank 22 at each crank angle CA. FIG. 5 is created by assuming that the engine revolution number NE is constant (2400 rpm) in the system in FIG. 3.

As illustrated in FIG. 5, if the ignition timing is set to #1->#3->#4->#2, each process (intake, exhaust processes and the like) of the engine is also performed in this order. Thus, if an intake valve of the #4 cylinder is opened at 0° CA, for example, a #2 intake valve is opened at 180° CA, a #1 intake valve at 360° CA, and a #3 intake valve at 540° CA, respectively.

Here, when attention is paid to the ratio of the EGR gas in the surge tank 22, it gradually decreases from 0° CA to 540° CA (FIG. 5(A)). On the other hand, an exhaust valve of the #4 cylinder (#4-EX) is opened at 450° CA. Thus, the ratio of the EGR gas in the surge tank 22 changes to rise at the vicinity of 450° CA as a border.

However, what should attract attention the most in FIG. 5 is that timing when an exhaust valve of the #4 cylinder is open overlaps with the timing when the intake valve of the #3 cylinder is open. Thus, most of the EGR gas exhausted from the #4 cylinder is likely to be sucked into the #3 cylinder at the same time as exhaustion. As described above, if most of the EGR gas is sucked into the #3 cylinder, the ratio of the EGR gas in the surge tank 22 becomes varied among the crank angles. If this phenomenon occurs at the large-quantity EGR, a large difference is caused between the amount of the EGR gas flowing into the #3 cylinder and the amount of the EGR gas flowing into the #1 cylinder.

Figure 6:
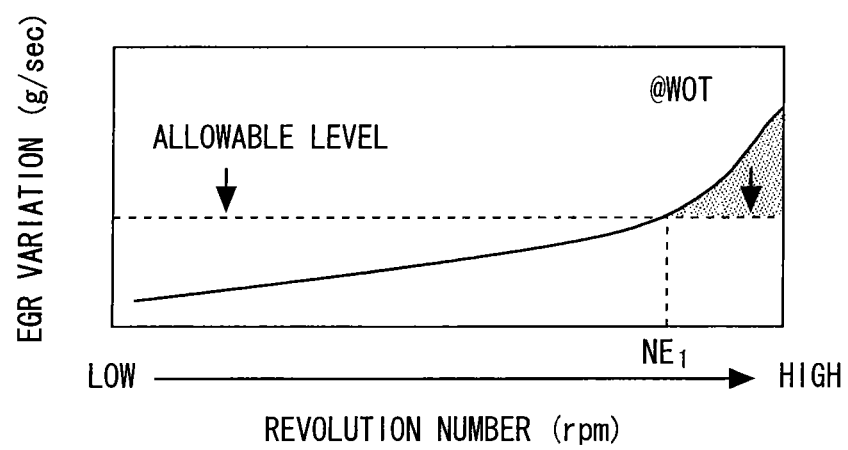
FIG. 6 is a diagram illustrating a change in variation of the EGR gas amount with respect to the engine revolution number NE (rpm).

FIG. 6 is a diagram illustrating a change in variation of the EGR gas amount with respect to the engine revolution number NE (rpm). FIG. 6 is created by acquiring a difference between the maximum value and the minimum value of the EGR gas amount in the surge tank 22 as variation when the throttle valve 20 is set to WOT (fully open) and the engine revolution number NE is changed and by plotting the result to the engine revolution number NE in the system in FIG. 3. As illustrated in FIG. 6, even if the engine revolution number NE is small, the EGR gas amount is varied. This is because the ratio of the EGR gas in the surge tank 22 is changed in accordance with the crank angle as described in FIG. 5. However, this variation is increased as the engine revolution number NE becomes larger and is further increased at the vicinity of a given revolution number $NE_1$ and exceeds an allowable level.

Figure 7:
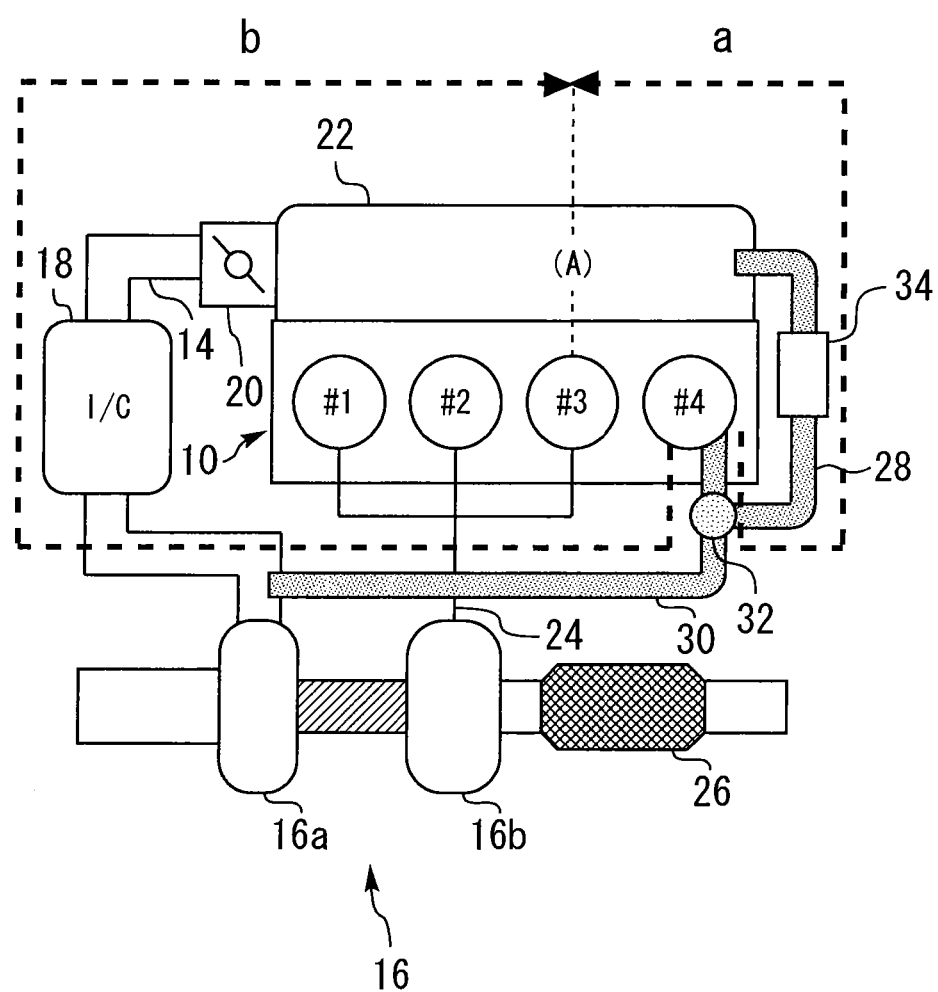
FIG. 7 is a diagram for explaining an advantage of the system configuration of Embodiment 1.

On the other hand, in the system of this embodiment, as illustrated in FIG. 1, not only the EGR passage 28 but the EGR passage 30 is provided. As a result, as illustrated in FIG. 7, the EGR gas can be made to flow separately through a path via the EGR passage 28 (hereinafter referred to as a "path a") and a path via the EGR passage 30 (hereinafter referred to as a "path b"). Particularly, by having the EGR gas flow through the path b, the EGR gas can be cooled by the intercooler 18. Since the intercooler 18 usually has a capacity larger than the EGR cooler 34, its cooling capability is higher. Therefore, according to the system of this embodiment, since the EGR gas can be made to flow into the surge tank 22 in a state where heat of the EGR gas is sufficiently emitted, occurrence of knocking can be suppressed better than the case where the EGR gas is cooled only by the EGR cooler 34 in FIG. 3.

Moreover, in the system of this embodiment, path lengths of the paths a and b are designed so that phases of two EGR gas pulsations (density fluctuation) reaching a predetermined position ((A) in FIG. 7, for example) in the surge tank 22 via the two paths a and b are shifted substantially by a half cycle (160° to 200°). As a result, since amplitude of a synthesized wave of the pulsations of the EGR gas via the path a (hereinafter also referred to as an "EGR gas (a)") and the EGR gas via the path b (hereinafter also referred to as an "EGR gas (b)") can be made small, variation in the EGR gas amount in the surge tank 22 can be reduced. The reason will be described below.

Since the EGR gas (a) and the EGR gas (b) flow out of the same cylinder (#4 cylinder), if the revolution number NE and the load are constant, cycles of the pulsation of the EGR gas (a) and the pulsation of the EGR gas (b) are the same. On the other hand, since the path a and the path b are different in path length, time when the EGR gas (a) generated at the same time reaches (A) in FIG. 7 is shifted from the time when the EGR gas (b) reaches there. Therefore, at (A) in FIG. 7, the phases of the pulsations of the EGR gases (a) and (b) are shifted from each other.

If the phases of the pulsations of the EGR gases (a) and (b) are shifted from each other, amplitude of the synthesized wave of these pulsations is changed. That is, if the phases of the pulsations of the EGR gases (a) and (b) are synchronized with each other (the phases are substantially matched with each other), the amplitude of the synthesized wave is amplified. On the other hand, if the phases of the pulsations of the EGR gases (a) and (b) are shifted substantially by a half cycle, they cancel each other, and the amplitude of the synthesized wave is made small.

In the system of this embodiment, the difference in the path length between the paths a and b can be determined on the basis of the maximum output revolution number of the engine 10 at the WOT. The cycles of the pulsations of the EGR gases (a) and (b) substantially depend on the engine revolution number NE. The maximum output revolution number is a high engine revolution number in general. Thus, by designing the difference in the path length so that the cycles of the pulsations at the maximum output revolution number of the engine 10 are shifted by a half cycle, the phases of the pulsations of the EGR gases (a) and (b) can be shifted from each other substantially by a half cycle in the high-rotation/high-load area.

Figure 8:
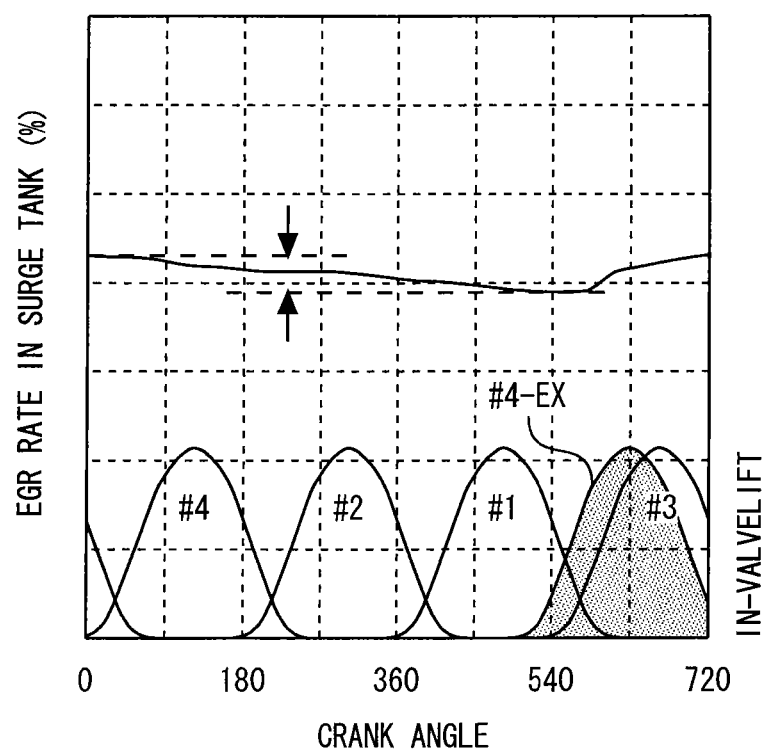
FIG. 8 is a diagram illustrating a change of a ratio of the EGR gas in the surge tank 22 at each crank angle CA.

FIG. 8 is a diagram illustrating a change of a ratio of the EGR gas in the surge tank 22 at each crank angle CA. In the system of this embodiment, FIG. 8 is created assuming that the engine revolution number NE is constant (2400 rpm). As illustrated in FIG. 8, the ratio of the EGR gas in the surge tank 22 takes a substantially constant value without variation in the crank angles. As a result, the EGR gas cooled by the intercooler 18 can be supplied equally to each cylinder and occurrence of knocking of the engine 10 can be favorably prevented.

Figure 9:
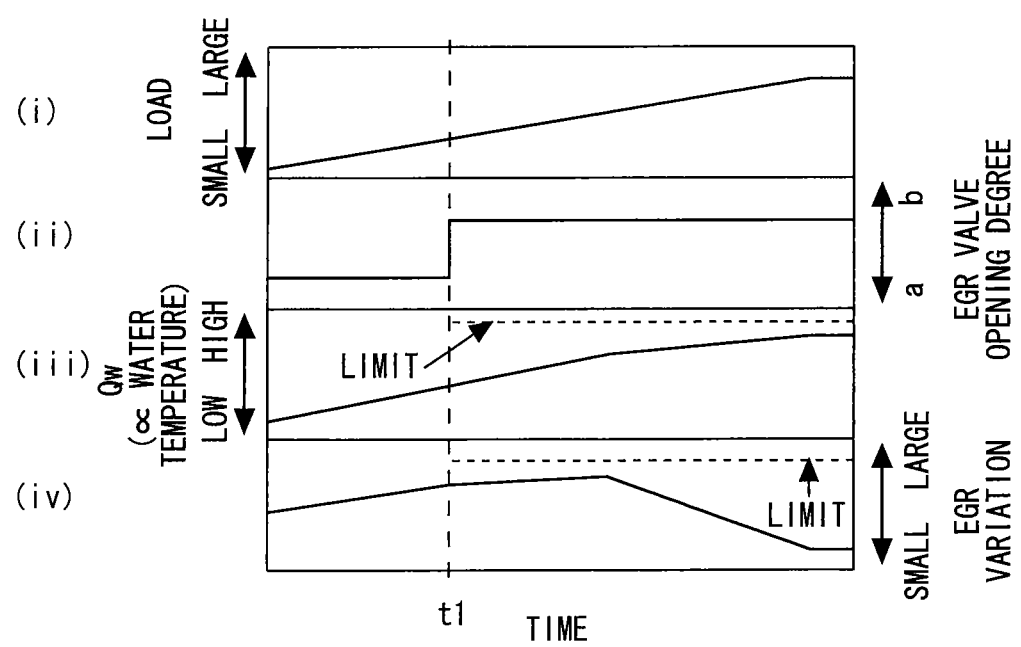
FIG. 9 is a timing chart illustrating variation in a load, an opening degree of an EGR valve 32, a target air-fuel ratio of a #4 cylinder, a radiation performance Qw of the engine cooling water, and the EGR gas amount in the surge tank 22 in Embodiment 1.

In this embodiment, by using the above-described system, the following control is further executed. FIG. 9 is a timing chart illustrating a load, an opening degree of the EGR valve 32, a target air-fuel ratio of the #4 cylinder, the radiation performance Qw of the engine cooling water, and the variation in the EGR gas amount in the surge tank 22 in this embodiment.

As illustrated in FIG. 9(i), assume that an operation area of the engine 10 enters a high load area at time t1. In this embodiment, as illustrated in FIG. 9(ii), the opening degree of the EGR valve 32 is adjusted at this timing so that the EGR gas flows to the path b side. Until the time t1, the EGR gas is made to flow only through the path a as normal EGR. As illustrated in FIG. 9(iv), if the EGR gas is made to flow only through the path a, variation in the EGR gas amount is generated in the surge tank 22. However, as described in FIG. 6, as long as the operation area of the engine 10 is not in the high load area, the variation in the EGR gas amount is within a range of the allowable level. Thus, only the path a is used until the time t1 so as to execute control of reducing a cooling loss and improving the fuel cost.

As illustrated in FIG. 9(ii), the opening degree of the EGR valve 32 is adjusted so that the EGR gas flows to the path b side at the time t1. As a result, the EGR gas is made to flow to the intercooler 18 to be cooled therein, and the temperature of the EGR gas flowing into the surge tank 22 is lowered.

As described above, the difference in the path length between the path a and the path b is designed so that the phases of the pulsations of the EGR gases (a) and (b) are shifted from each other substantially by a half cycle. Therefore, as illustrated in FIG. 9(iv), the variation in the EGR gas amount in the surge tank 22 can be reduced. According to this embodiment as above, as illustrated in FIG. 9(iii), since the operation in the radiation performance Qw of the engine cooling water becomes possible, occurrence of knocking can be favorably prevented.

Specific Processing in Embodiment 1

Figure 10:
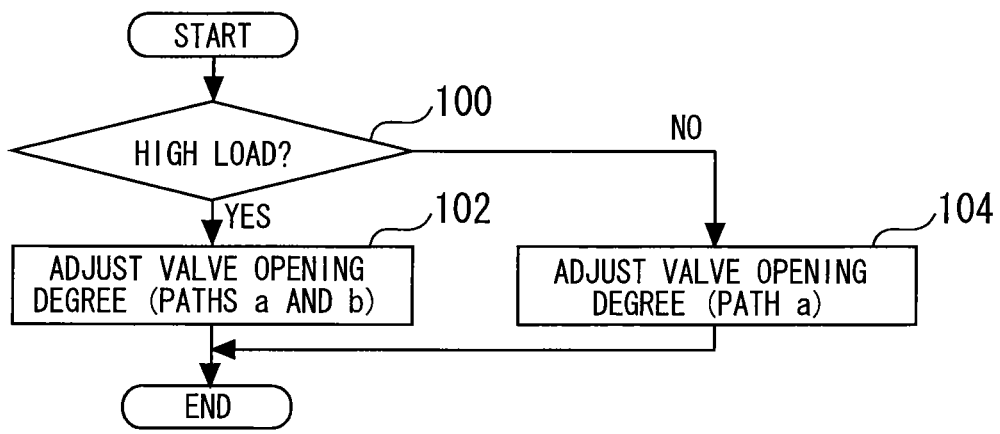
FIG. 10 is a flowchart of a routine executed by an ECU 60 in Embodiment 1.

Subsequently, specific processing for realizing the above-described control will be explained by referring to FIG. 10. FIG. 10 is a flowchart of a routine executed by the ECU 60 in this embodiment. The routine illustrated in FIG. 10 is repeatedly executed during operation of the engine.

According to the routine illustrated in FIG. 10, first, the ECU 60 determines whether the current operation area of the engine 10 is in the high load area or not (Step 100). Whether the operation area is in the high load area or not can be determined on the basis of whether the throttle opening degree TA is at a throttle opening degree $TA_1$ set in advance or more. Here, the throttle opening degree $TA_1$ is an upper limit value of the throttle opening degree TA determined separately and is assumed to be stored in the ECU 60 in advance.

If it is determined that the current operation area of the engine 10 is in the high load area, the ECU 60 adjusts the opening degree of the EGR valve 32 so that the EGR gas flows to both of the paths a and b (Step 102). On the other hand, if it is determined that the current operation area of the engine 10 is not in the high load area, the ECU 60 adjusts the opening degree of the EGR valve 32 so that the EGR gas flows only through the path a (Step 104).

As described above, according to the routine illustrated in FIG. 10, if the operation area of the engine 10 is in the high load area, the EGR gas can be made to flow through the path b. Therefore, the EGR gas which has flowed through the path b and sufficiently emitted heat can be made to flow into the surge tank 22. Therefore, the fuel cost utilizing a large-quantity EGR can be improved while occurrence of knocking in the high load area is favorably prevented.

In the above-described Embodiment 1, the EGR passage 28 corresponds to the "downstream-side EGR passage" in the first invention and the EGR passage 30 corresponds to the "upstream-side EGR passage" in the first invention, respectively.

Moreover, in the above-described Embodiment 1, the EGR passage 28 corresponds to the "downstream-side EGR passage" in the fourth invention, the EGR passage 30 corresponds to the "upstream-side EGR passage" in the fourth invention, and the EGR valve 32 corresponds to the "control valve" in the fourth invention, respectively.

Moreover, in the above-described Embodiment 1, the "target opening-degree adjusting means" in the fifth invention is realized by the ECU 60 executing the processing at Step 102 in FIG. 10.

Embodiment 2

Subsequently, Embodiment 2 of the present invention will be described by referring to FIGS. 11 to 13. In this embodiment, a difference from the above-described Embodiment 1 will be mainly explained, and for the similar matters, the explanation will be simplified or omitted.

Configuration of Embodiment 2

Figure 11:
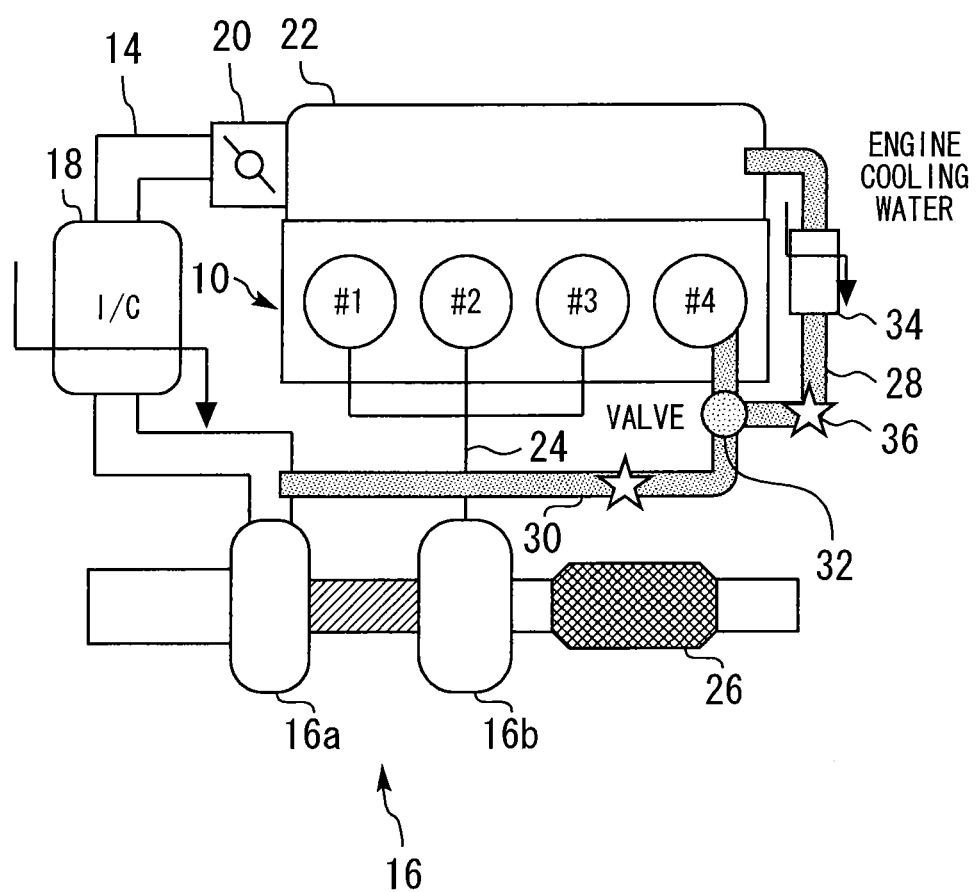
FIG. 11 is a diagram for explaining a system configuration of Embodiment 2.

FIG. 11 is a diagram for explaining a system configuration of Embodiment 2. The system of this embodiment is different from the system configuration of Embodiment 1 in a point that the EGR catalyst 36 for purifying the EGR gas is installed in the EGR passage 28.

Characteristics of Embodiment 2

In Embodiment 1, when the operation area of the engine 10 is in the high load area, the control is executed such that the opening degree of the EGR valve 32 is adjusted, and the EGR gas is made to flow to the path b side. However, even if the control in Embodiment 1 is executed, if the actual engine cooling-water temperature Tw has become a high temperature, the radiation performance Qw of the engine cooling water cannot catch up with that, and thus knocking may occur. Moreover, if the bed temperature Tc of the EGR catalyst 36 has become a high temperature, the purification capability of the EGR catalyst 36 is lowered. Thus, exhaust emission might be deteriorated.

Then, in this embodiment, the engine cooling-water temperature Tw and the bed temperature Tc are monitored, and the opening degree of the EGR valve 32 is corrected. As a result, the fuel cost utilizing the large-quantity EGR can be drastically improved while the engine cooling-water temperature Tw and the bed temperature Tc are prevented from becoming excess temperatures.

Specific Processing in Embodiment 2

Subsequently, specific processing for realizing the above-described control will be described by referring to FIG. 12. FIG. 12 is a flowchart of a routine executed by the ECU 60 in this embodiment. The routine illustrated in FIG. 12 is repeatedly executed during the operation of the engine in place of the routine illustrated in FIG. 10 in Embodiment 1.

Figure 12:
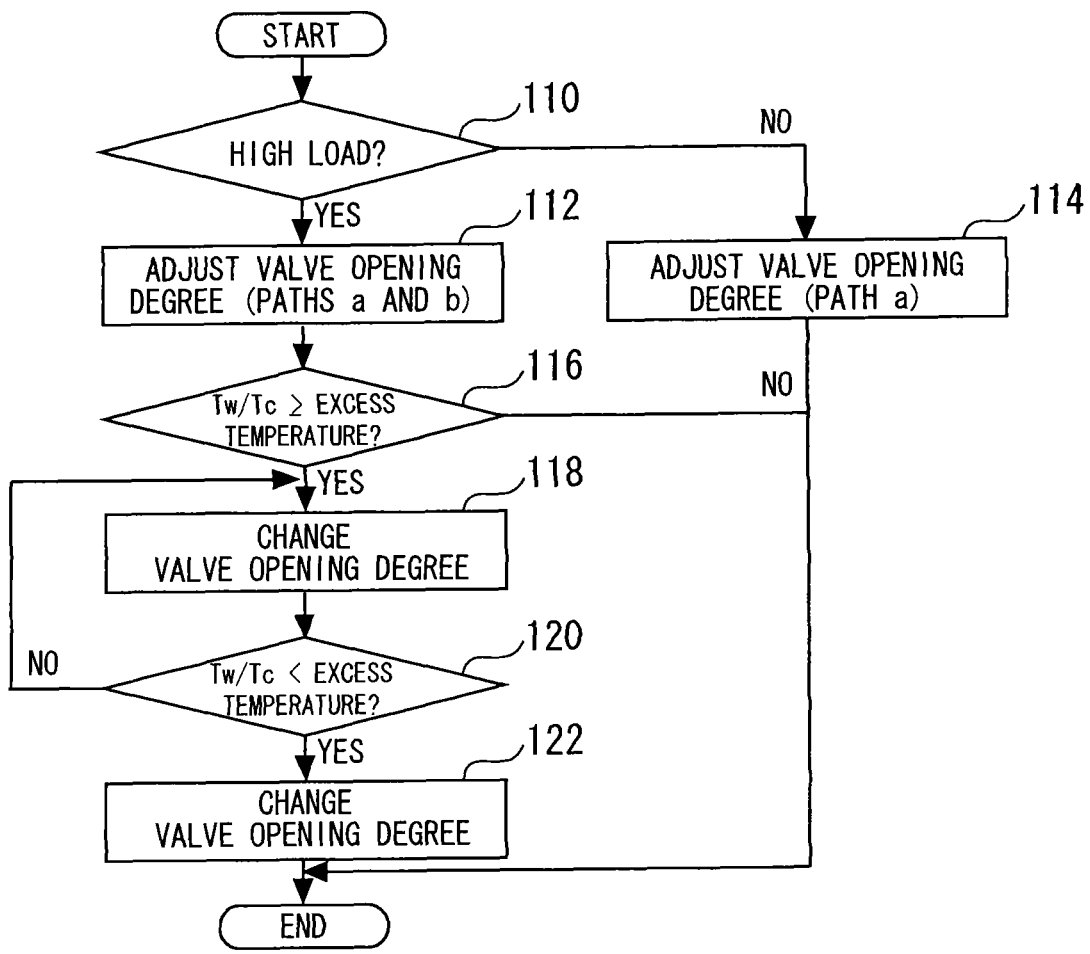
FIG. 12 is a flowchart of a routine executed by the ECU 60 in Embodiment 2.

According to the routine illustrated in FIG. 12, first, the ECU 60 executes processing at Steps 110 to 114. Since these steps of the processing are the same as those from Steps 100 to 104 in FIG. 10, the explanation will be omitted.

Subsequently to Step 112, the ECU 60 determines whether the engine cooling-water temperature Tw has become an excess temperature $Tw_1$ or more or the bed temperature Tc of the EGR catalyst 36 has become an excess temperature $Tc_1$ or more or not (Step 116). Here, each of the excess temperatures $Tw_1$ and $Tc_1$ of the engine cooling-water temperature Tw and the bed temperature Tc is an upper limit temperature determined separately and is assumed to be stored in the ECU 60 in advance. The engine cooling-water temperature Tw can be detected by the water temperature sensor 52. Similarly, the bed temperature Tc of the EGR catalyst 36 can be detected by the EGR bed temperature sensor 54.

When at least one of the engine cooling-water temperature Tw and the bed temperature Tc is the excess temperature $Tw_1$ or $Tc_1$ or more, the ECU 60 changes the opening degree of the EGR valve 32 so that more EGR gas flows to the path b side (Step 118). Here, the opening degree of the EGR valve 32 is changed by referring to an opening-degree change map illustrated in FIG. 13.

For example, assume that the ECU 60 executes the processing at Step 112, and the opening degree of the EGR valve 32 is set as EGR gas (a): EGR gas (b)=50:50 (FIG. 13(A)). Then, by means of the processing at this step, the ratio is further changed to EGR gas (a): EGR gas (b)=40:60, for example (FIG. 13(B)). On the other hand, when both of the engine cooling-water temperature Tw and the bed temperature Tc are lower than the excess temperatures $Tw_1$ and $Tc_1$, the ECU 60 ends this routine without changing the opening degree of the EGR valve 32. As a result, the opening degree of the EGR valve 32 after the processing at Step 112 is maintained.

Subsequently, the ECU 60 determines whether the engine cooling-water temperature Tw has become lower than an excess temperature $Tw_2$ or the bed temperature Tc has become lower than an excess temperature $Tc_2$ or not (Step 120). Here, each of the excess temperatures $Tw_2$ and $Tc_2$ of the engine cooling-water temperature Tw and the bed temperature Tc of the EGR catalyst 36 is the same value as each of the excess temperatures $Tw_1$ and $Tc_1$ used at Step 116 and is assumed to be stored in the ECU 60 in advance.

When at least one of the engine cooling-water temperature Tw and the bed temperature Tc is the excess temperature $Tw_2$ or $Tc_2$ or more, the ECU 60 makes the determination at Step 120 again. On the other hand, when both of the engine cooling-water temperature Tw and the bed temperature Tc are lower than the excess temperatures $Tw_2$ and $Tc_2$, the ECU 60 refers to an opening-degree change map illustrated in FIG. 13 and changes the opening degree of the EGR valve 32 (Step 122). As a result, the opening degree is changed to that of the EGR valve 32 after the processing at Step 112.

Figure 13:
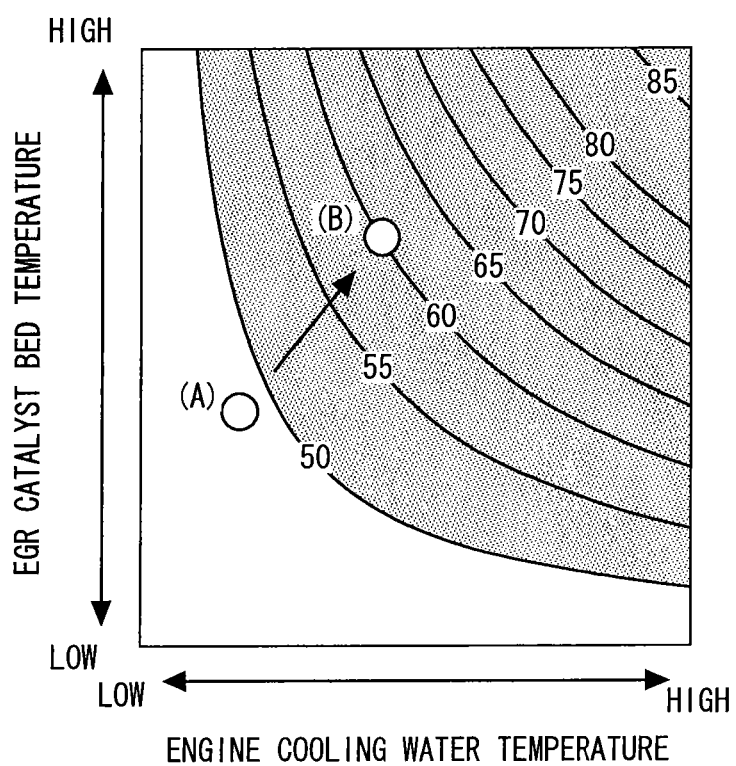
FIG. 13 is an example of a map for changing the opening degree of the EGR valve 32.

According to the routine illustrated in FIG. 12 as above, when the operation area of the engine 10 is in the high load area, the engine cooling-water temperature Tw and the bed temperature Tc are monitored, and the opening degree of the EGR valve 32 can be finely adjusted by referring to a ratio change map illustrated in FIG. 13. Therefore, the fuel cost utilizing the large-quantity EGR can be drastically improved while the engine cooling-water temperature Tw and the bed temperature Tc are prevented from becoming excess temperatures.

In the above-described Embodiment 2, when the ECU 60 executes the processing at Step 116 in FIG. 12, the "cooling water temperature determining means" in the sixth invention and the "bed temperature determining means" in the ninth invention are realized, respectively.

Embodiment 3

Subsequently, Embodiment 3 of the present invention will be described by referring to FIGS. 14 to 16. This embodiment is characterized by execution of a routine in FIG. 16 which will be described later by the ECU 60 in the system configuration of the above-described Embodiment 2.

Characteristics of Embodiment 3

In Embodiment 2, when it is determined that the current operation area of the engine 10 is in the high load area, the ECU 60 adjusts the opening degree of the EGR valve 32 so that the EGR gas flows to both of the paths a and b (see Step 112 in FIG. 12). However, a given time (hereinafter referred to as "convergence delay period $t_{EGR}$") is required until the opening degree of the EGR valve 32 converges to a target opening degree. Thus, the engine cooling-water temperature Tw and the bed temperature Tc might rise in the convergence delay period $t_{EGR}$. On the other hand, in the case of a shift to the high load area in a short time, despite the convergence of opening degree of the EGR valve 32 to the target opening degree, the engine cooling-water temperature Tw or the bed temperature Tc might reach the excess temperature.

Thus, in this embodiment, in the opening-degree adjustment of the EGR valve 32, the convergence delay period $t_{EGR}$ of the EGR valve 32 is considered, and time until the engine cooling-water temperature Tw (or the bed temperature Tc) reaches an excess temperature $Tw_3$ (or $Tc_3$) (hereinafter they are collectively referred to as "excess temperature time $t_{OT}$") is estimated from the load information until the start of the adjustment of the opening degree of the EGR valve 32. Then, at the start of the opening-degree adjustment of the EGR valve 32, the convergence delay period $t_{EGR}$ and the excess temperature time $t_{OT}$ are compared with each other, and single-cylinder fuel-rich control is executed over the longer of these periods.

Here, the convergence delay period $t_{EGR}$ of the EGR valve 32 is assumed to be stored in the ECU 60 in advance as a delay period of the system. On the other hand, the excess temperature time $t_{OT}$ can be estimated by storing load information (history) in the ECU 60, by calculating a rise margin of the engine cooling-water temperature Tw (or the bed temperature Tc) by using that, and by using this rise margin. The excess temperatures $Tw_3$ and $Tc_3$ are the same values as the excess temperatures $Tw_1$ and $Tc_1$ used in Embodiment 2, respectively, and are assumed to be stored in the ECU 60 in advance.

(Single-cylinder Fuel-rich Control)

Subsequently, the single-cylinder fuel-rich control executed in this embodiment will be described. The single-cylinder fuel-rich control is to correct a fuel injection amount of the injector 12 of the #4 cylinder so that the air-fuel ratio of the #4 cylinder becomes richer in fuel than a stoichiometric state. By executing the single-cylinder fuel-rich control, a steam alteration effect can be obtained.

Here, the steam alteration effect will be described. The steam alteration effect is exerted by the following Formula (1) and Formula (2):

$$C_nH_m + nH_2O \rightarrow nCO + (m/2+n)H_2 \quad (1)$$

$$CO + H_2O \rightarrow CO_2 + H_2 \quad (2)$$

A reaction of Formula (1) progresses with a reaction of the fuel with steam in the #4 cylinder, and a reaction in Formula (2) progresses with a reaction of carbon monoxide generated in the reaction in Formula (1) with steam in the EGR passages 28 and 30 and the #1 to #4 cylinders. The reaction in Formula (2) is referred to as a water gas shift reaction and an endothermic reaction in which heat outside the system is absorbed as reaction energy. Therefore, as the reaction in Formula (2) progresses, a cooling effect by heat absorption can be obtained, and occurrence of knocking of the engine 10 can be prevented.

Figure 14:
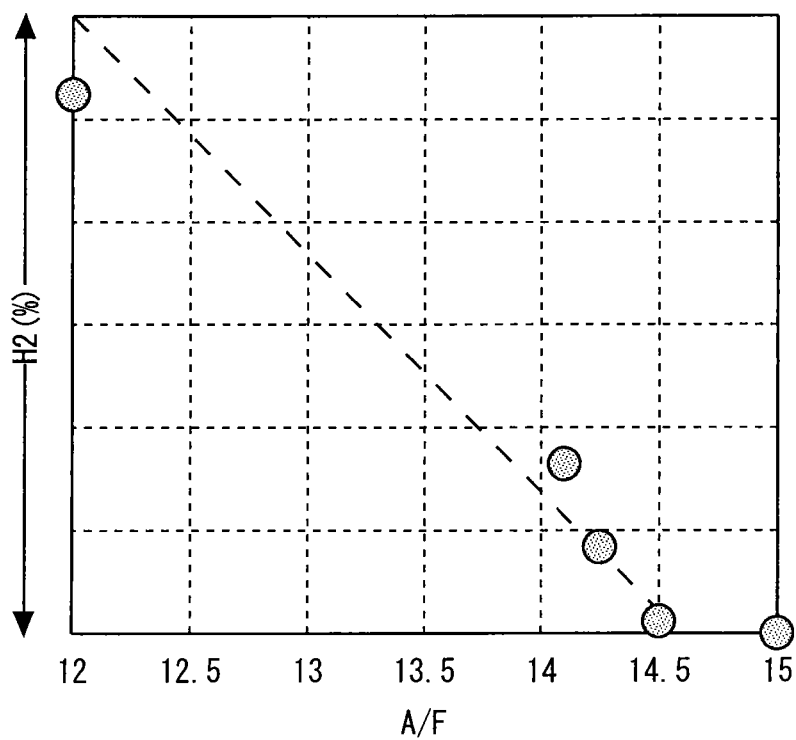
FIG. 14 is a diagram illustrating a change in hydrogen concentration with respect to an exhaust air-fuel ratio.

FIG. 14 is a diagram illustrating a change of hydrogen concentration with respect to an exhaust air-fuel ratio. FIG. 14 shows that when the hydrogen concentration in the exhaust gas becomes higher, the exhaust air-fuel ratio is richer in fuel than the stoichiometric state (=14.6). Moreover, the richer in fuel the air-fuel ratio becomes than the stoichiometric state, the more the hydrogen concentration in the exhaust gas increases. This is because there is much $C_nH_m$ in the fuel-rich atmosphere, and thus, the reaction in Formula (1) progresses and hydrogen is generated in a large quantity. Moreover, carbon monoxide generated with hydrogen in the reaction in Formula (1) becomes a reacting substance in Formula (2), and as the result of progress of the reaction in Formula (2), hydrogen is generated more. Therefore, in the fuel-rich atmosphere, a large quantity of hydrogen can be generated.

Here, the large quantity of hydrogen generated in the #4 cylinder flows through the EGR passages 28 and 30 in a state contained in the EGR gas and flows into each cylinder via the surge tank 22. Therefore, by executing the single-cylinder fuel-rich control, ignition performance of each cylinder of the engine 10 can be improved. As a result, by executing the single-cylinder fuel-rich control, the steam alteration effect such as cooling by the water gas shift reaction and the improvement in ignition performance realized by the generated hydrogen can be obtained.

Figure 15:
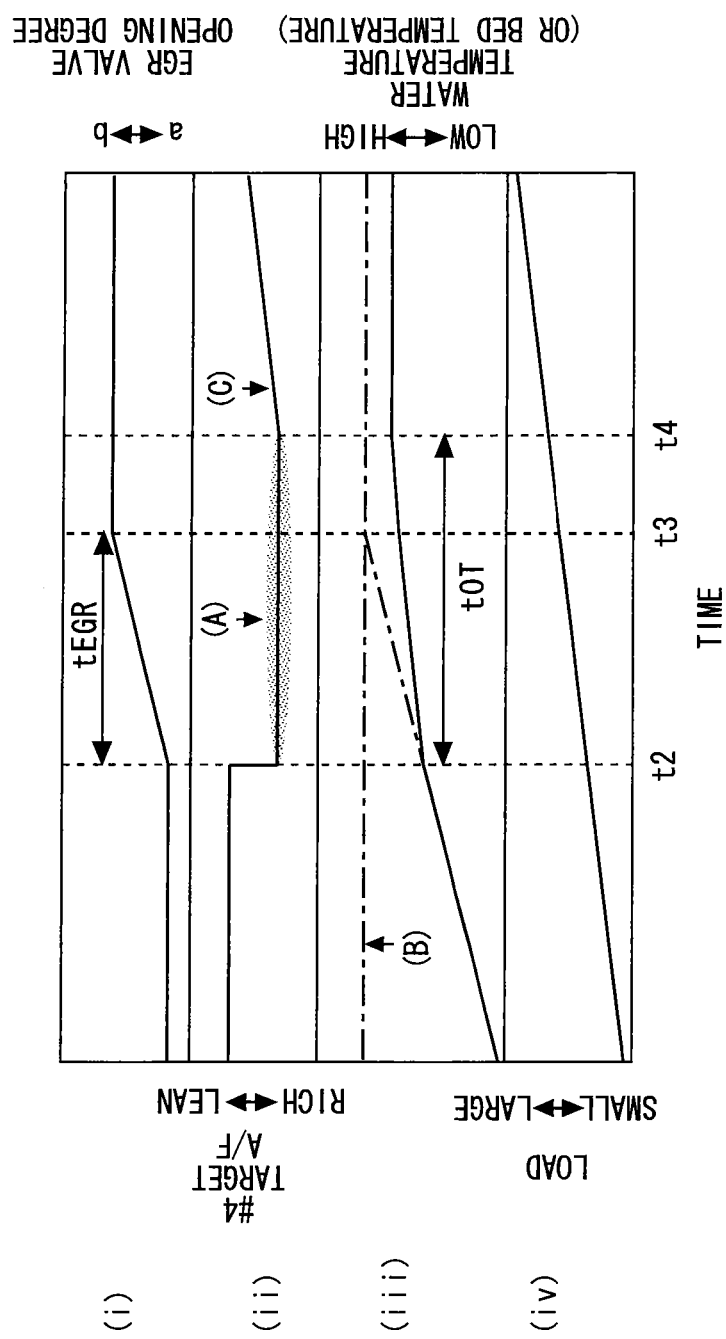
FIG. 15 is a timing chart illustrating the opening degree of the EGR valve 32, the target air-fuel ratio of the #4 cylinder, the engine cooling water temperature Tw (or a bed temperature Tc), and the load in Embodiment 3.

FIG. 15 is a timing chart illustrating the opening degree of the EGR valve 32, the target air-fuel ratio of the #4 cylinder, the engine cooling-water temperature Tw (or the bed temperature Tc), and the load in this embodiment.

As illustrated in FIG. 15(iv), assume that the operation area of the engine 10 enters the high load area at time t2. In this embodiment, similarly to Embodiment 1, the adjustment of the opening degree of the EGR valve 32 is started at this timing so that the EGR gas flows to the path b side. The opening degree of the EGR valve 32 is assumed to be converged a certain time (time t3) after the start of the opening-degree adjustment.

In this figure, assume that the excess temperature time $t_{OT}$ is longer than the convergence delay period $t_{EGR}$. In that case, as illustrated in FIG. 15(ii), the single-cylinder fuel-rich control is executed from the time t2 to time t4 (FIG. 15(A)). That is, after the start of the opening-degree adjustment of the EGR valve 32, the single-cylinder fuel-rich control is executed over the excess temperature time $t_{OT}$. As a result, since a rise of the engine cooling-water temperature Tw (or the bed temperature Tc) can be suppressed, the engine cooling-water temperature Tw (or the bed temperature Tc) can be prevented from reaching the excess temperature (FIG. 15(B)) despite the convergence of the opening degree of the EGR valve 32 to the target opening degree.

If the convergence delay period $t_{EGR}$ is longer than the excess temperature time $t_{OT}$, after the start of the opening-degree adjustment of the EGR valve 32, the single-cylinder fuel-rich control is executed over the convergence delay period $t_{EGR}$. As a result, the engine cooling-water temperature Tw (or the bed temperature Tc) can be prevented from reaching the excess temperature (FIG. 15(B)) in the convergence delay period $t_{EGR}$.

Particularly, in this embodiment, such single-cylinder rich control can be realized at the same time with the large-quantity EGR. If the EGR amount increases in a state with a large quantity of hydrogen molecules, a distance between the hydrogen molecules in the cylinder can be made narrow. If the distance between the hydrogen molecules is narrow, a speed in combustion can be improved as compared with the time of a normal EGR. Therefore, according to this embodiment, in addition to appropriate management of the engine cooling water temperature Tw (or the bed temperature Tc), engine cooling by the steam alteration effect, improvement of the ignition performance, and drastic improvement of a fuel cost utilizing the large-quantity EGR can be realized.

Moreover, in this embodiment, at the time t4 and after, the fuel-rich degree is gradually decreased, and the stoichiometric state is recovered (FIG. 15(C)). As a result, an air-fuel ratio difference generated when the ECU 60 returns to the normal air-fuel ratio feedback control from the single-cylinder rich control can be reduced.

Specific Processing in Embodiment 3

Subsequently, the specific processing for realizing the above-described control will be explained by referring to FIG. 16. FIG. 16 is a flowchart of a routine executed by the ECU 60 in this embodiment. The routine illustrated in FIG. 16 is assumed to be repeatedly executed during the operation of the engine in place of the routine illustrated in FIG. 10.

Figure 16:
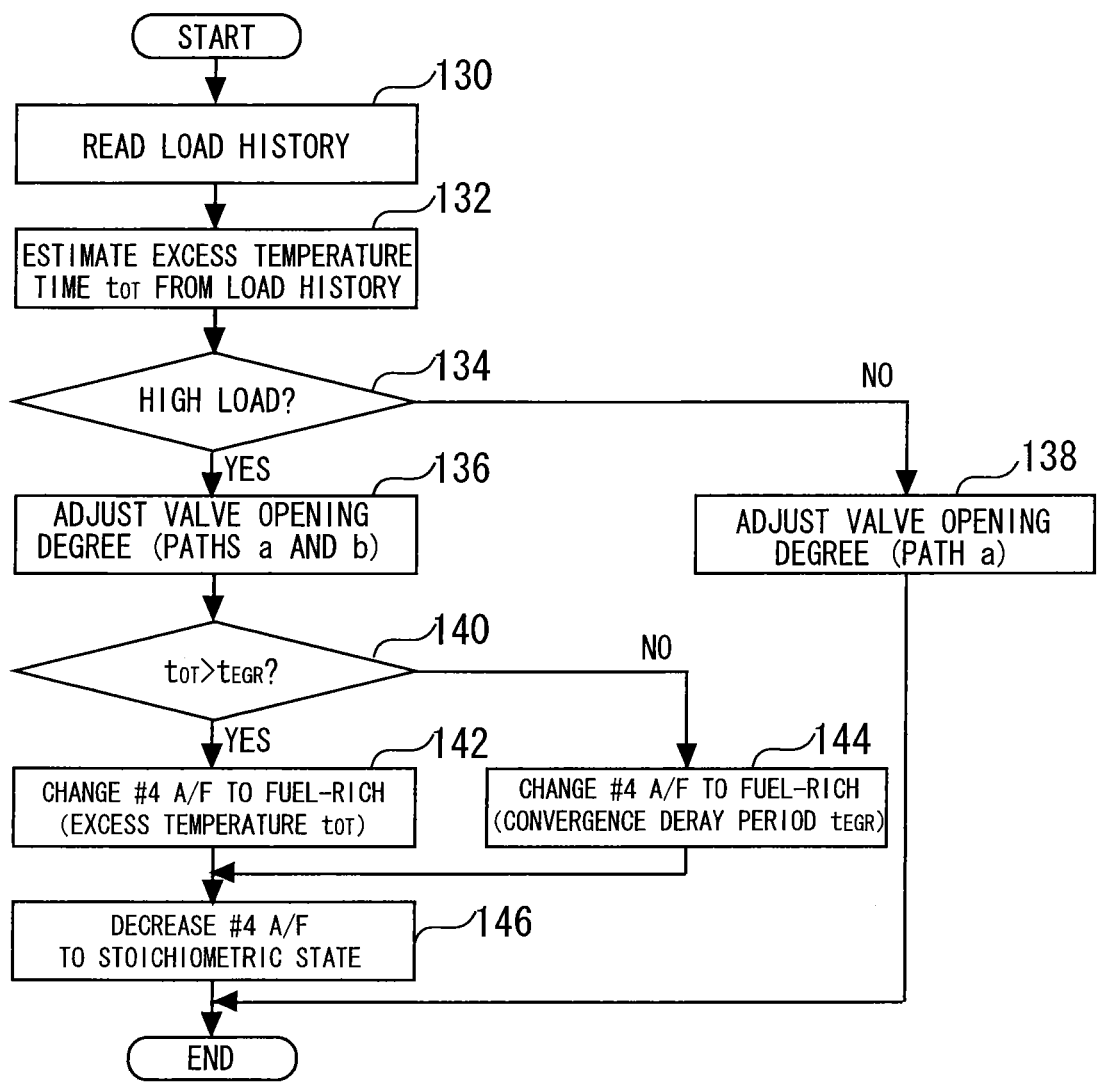
FIG. 16 is a flowchart of a routine executed by the ECU 60 in Embodiment 3.

According to the routine illustrated in FIG. 16, first, the ECU 60 executes reading of a load history (Step 130). Specifically, data of the current throttle opening degree TA and the data of the throttle opening degree TA stocked in the ECU 60 until the current time are read. An amount of data to be read can be set as appropriate in accordance with estimation accuracy of the excess temperature time $t_{OT}$.

Subsequently, the ECU 60 estimates the excess temperature time $t_{OT}$ from the load history (Step 132). Specifically, a rise margin of the engine cooling-water temperature Tw (or the bed temperature Tc) is calculated from the data of the throttle opening degree TA obtained at Step 130, and the excess temperature time $t_{OT}$ is estimated by using this rise margin.

Subsequently, the ECU 60 executes processing at Steps 134 to 138. Since these steps of the processing are the same as those from Steps 100 to 104 in FIG. 10, the explanation will be omitted.

Subsequently to Step 136, the ECU 60 compares the convergence delay period $t_{EGR}$ with the excess temperature time $t_{OT}$ (Step 140). As described above, the convergence delay period $t_{EGR}$ is a value stored in advance in the ECU 60. Moreover, the excess temperature time $t_{OT}$ is a value estimated at Step 132.

If it is determined that the excess temperature time $t_{OT} \geq$ the convergence delay period $t_{EGR}$ as the result of comparison between the convergence delay period $t_{EGR}$ and the excess temperature time $t_{OT}$, the ECU 60 changes the target air-fuel ratio of the #4 cylinder to fuel-rich over the excess temperature time $t_{OT}$ (Step 142). On the other hand, if it is determined that the excess temperature time $t_{OT}$<the convergence delay period $t_{EGR}$, the ECU 60 changes the target air-fuel ratio of the #4 cylinder to fuel-rich over the convergence delay period $t_{EGR}$ (Step 144). Through Step 142 or Step 144, the single-cylinder fuel-rich control is executed. Then, subsequently to Step 142 or Step 144, the ECU 60 gradually returns the target air-fuel ratio of the #4 cylinder to the stoichiometric state (Step 146).

According to the routine illustrated in FIG. 16 above, at the same time as the start of the adjustment of the opening degree of the EGR valve 32, the single-cylinder fuel-rich control can be executed over the longer period of the convergence delay period $t_{EGR}$ and the excess temperature time $t_{OT}$. Therefore, the engine cooling-water temperature Tw (or the bed temperature Tc) can be reliably prevented from reaching the excess temperature. Moreover, according to the routine illustrated in FIG. 16, after the convergence delay period $t_{EGR}$ or the excess temperature time $t_{OT}$ has elapsed, the fuel-rich degree can be gradually decreased and returned to the stoichiometric state. The step in the air-fuel ratio generated at the recovery from the single-cylinder rich control to the air-fuel ratio feedback control can be made small.

In the above-described Embodiment 3, the "load history obtaining means" in the seventh and ninth inventions is realized when the ECU 60 executes the processing at Step 130 in FIG. 16, the "excess time estimating means" in the seventh and ninth inventions is realized when the ECU 60 executes the processing at Step 132 in FIG. 16, the "excess time comparing means" in the seventh and ninth inventions is realized when the ECU 60 executes the processing at Step 140 in FIG. 16, and the "EGR exclusive cylinder enriching means" in the seventh and ninth inventions is realized when the ECU 60 executes the processing at Step 142 or Step 144 in FIG. 16, respectively.

Embodiment 4

Subsequently, Embodiment 4 of the present invention will be described by referring to FIGS. 17 to 20. This embodiment is characterized in that the ECU 60 executes a routine in FIG. 20 which will be described later in the system configuration of the above-described Embodiment 2.

Characteristics of Embodiment 4

In Embodiment 3, the ECU 60 starts the adjustment of the opening degree of the EGR valve 32 if the operation area of the engine 10 enters the high load area and executes the single-cylinder fuel-rich control over the predetermined period (see Step 142 or Step 144 in FIG. 16). However, if the single-cylinder fuel-rich control is executed at the timing when the adjustment of the opening degree of the EGR valve 32 is started, the following problem might occur.

That is, since the path b is longer than the path a, the EGR gas having passed through the path b flows into the surge tank 22 at timing delayed from the timing of the EGR gas having passed through the path a. Thus, if the single-cylinder fuel-rich control is executed, the EGR gas having passed through the path b flows into the surge tank 22 with a given time delay. Therefore, if the single-cylinder fuel-rich control is executed at the timing when the adjustment of the opening degree of the EGR valve 32 is started, the air-fuel ratio rapidly changes when the EGR gas having passed through the path b flows in, and drivability might be deteriorated.

Then, in this embodiment, in the execution of the single-cylinder fuel-rich control, control is executed in which a time constant is given to each of the target air-fuel ratios of the #1 to #3 cylinders to make the air-fuel ratios richer in fuel than the stoichiometric state. As a result, since a step in the air-fuel ratio caused by a rapid change in the air-fuel ratio can be made small, deterioration of drivability can be prevented.

Figure 17:
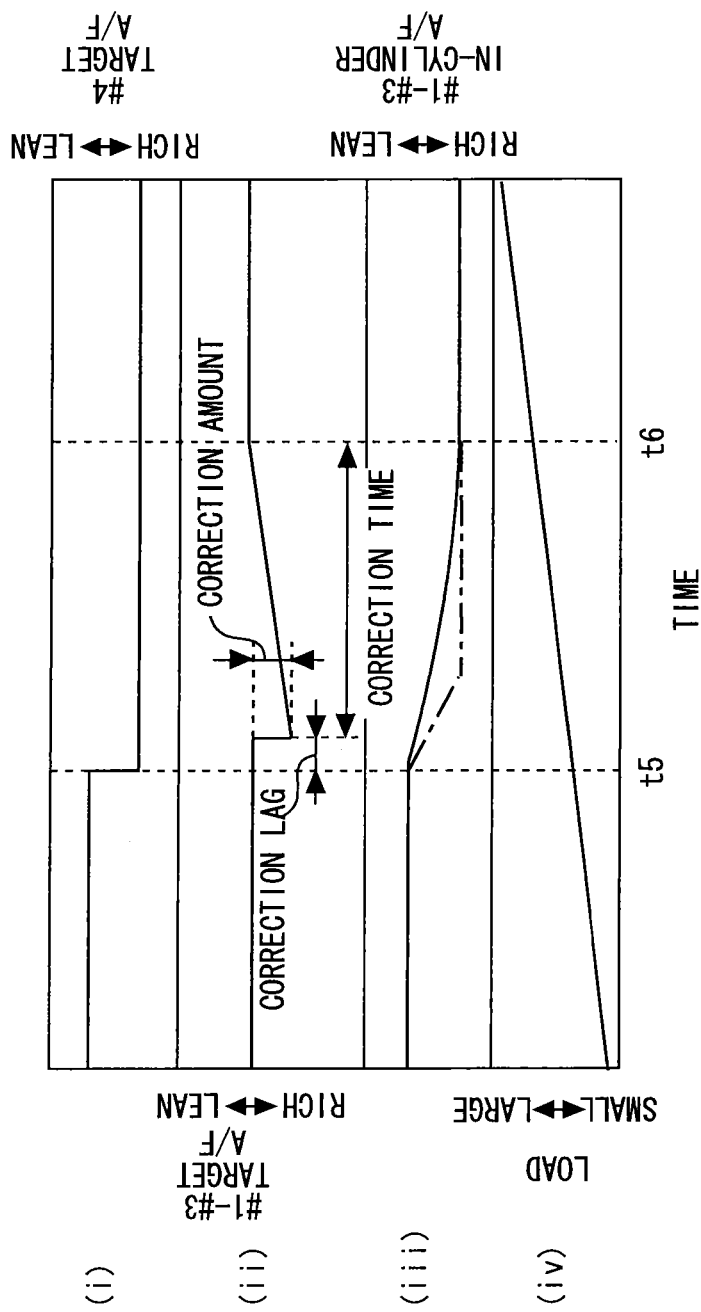
FIG. 17 is a timing chart illustrating a target air fuel ratio of #4 cylinder, the target air-fuel ratios of #1 to #3 cylinders, actual air-fuel ratios of the #1 to #3 cylinders, and the load in Embodiment 4.

FIG. 17 is a timing chart illustrating a target air-fuel ratio of the #4 cylinder, the target air-fuel ratios of the #1 to #3 cylinders, actual air-fuel ratios of the #1 to #3 cylinders and a load in this embodiment.

As illustrated in FIG. 17(*iv*), assume that the operation area of the engine 10 enters the high load area at time t5. In this embodiment, similarly to Embodiment 1, the adjustment of the opening degree of the EGR valve 32 is started at this timing so that the EGR gas flows to the path b side. Then, as indicated by a broken line in FIG. 17(*iii*), the air-fuel ratio rapidly changes when the EGR gas having passed through the path b flows in.

Figure 18:
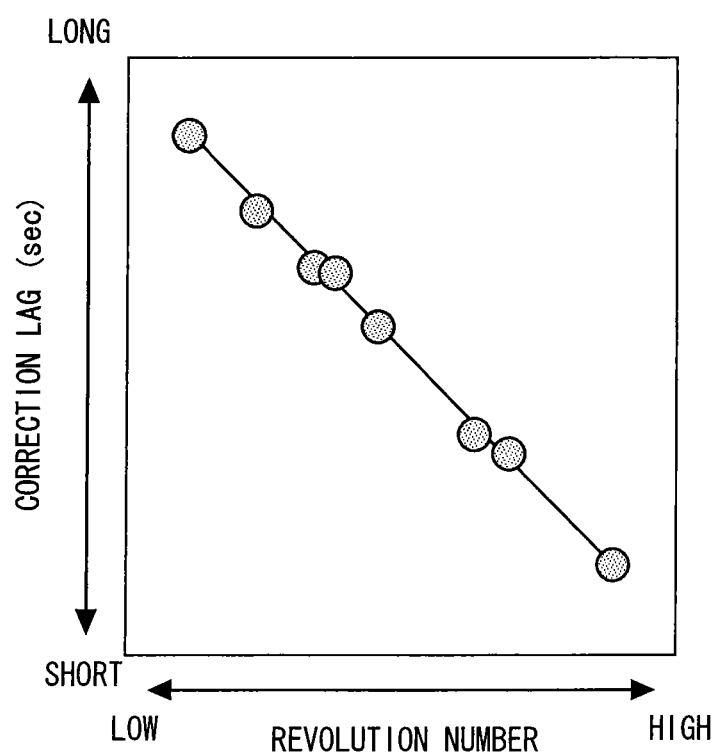
FIG. 18 is a diagram illustrating a relationship between the engine revolution number NE and a correction lag.

Then, in this embodiment, as illustrated in FIG. 17(*ii*), the air-fuel ratios of the #1 to #3 cylinders are switched to fuel-rich and then, controlled so as to gradually return to the stoichiometric side by time t6. When the air-fuel ratios of the #1 to #3 cylinders are switched to fuel-rich, a correction lag is provided. Here, the correction lag can be set, as illustrated in FIG. 18, in proportion to the engine revolution number NE. Specifically, the higher the engine revolution number NE is, the shorter the correction lag is set. As a result, the air-fuel ratios of the #1 to #3 cylinders can be set in the fuel-rich state before the EGR gas having passed through the path b flows into the surge tank 22.

Figure 19:
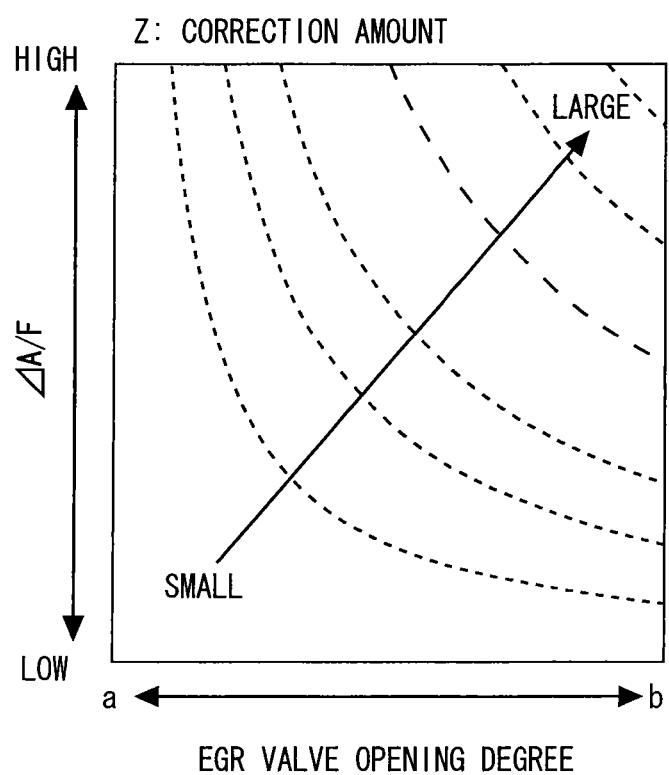
FIG. 19 is a diagram illustrating a relationship between the opening degree of the EGR valve 32 and a rich correction amount.

A correction amount when the air-fuel ratios of the #1 to #3 cylinders are switched to the rich side can be set, as illustrated in FIG. 19, for example, in accordance with the opening degree of the EGR valve 32 and the degree of enriching of the #4 cylinder. Specifically, the larger in quantity the EGR gas to be made to flow to the path b side is and the larger the degree of enriching of the #4 cylinder is, the larger the correction amount is set. Moreover, correction time during which the air-fuel ratios of the #1 to #3 cylinders are set to fuel-rich can be set on the basis of the engine revolution number NE and the capacity of the path b. As illustrated in FIG. 17(*iii*), by setting the correction amount and the correction time as above, the step in the air-fuel ratio caused when the EGR gas having passed through the path b flows into the surge tank 22 can be made small, and thus, deterioration of drivability can be prevented.

Specific Processing in Embodiment 4

Subsequently, specific processing for realizing the above-described control will be explained by referring to FIG. 20.

Figure 20:
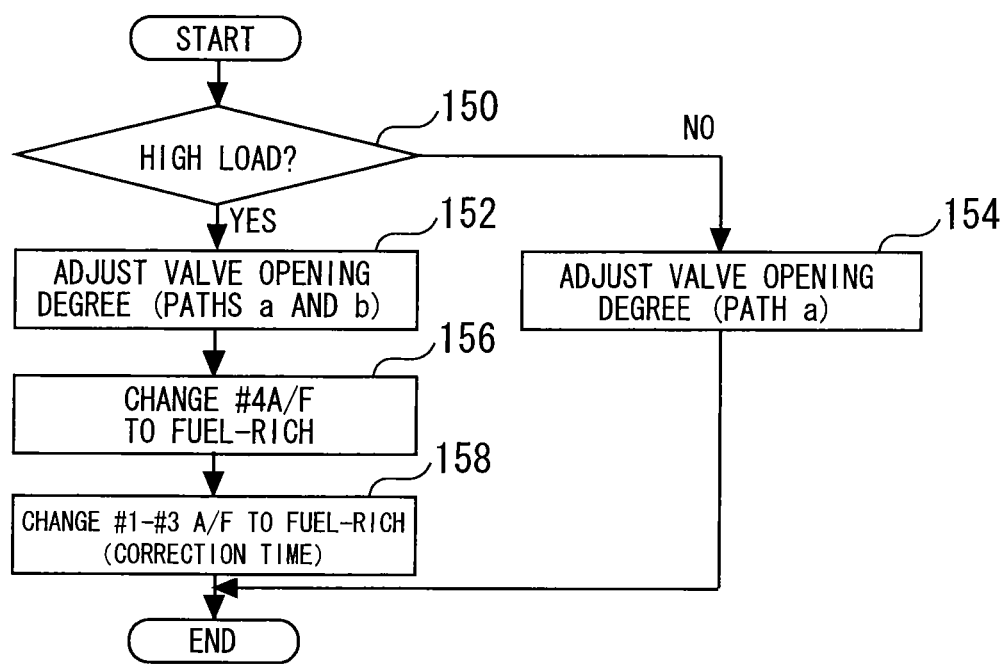
FIG. 20 is a flowchart of a routine executed by the ECU 60 in Embodiment 4.

FIG. 20 is a flowchart of a routine executed by the ECU 60 in this embodiment. The routine illustrated in FIG. 20 is assumed to be repeatedly executed during operation of the engine in place of the routine illustrated in FIG. 10.

According to the routine illustrated in FIG. 20, first, the ECU 60 executes processing at each of Steps 150 to 154. Since these steps of the processing are the same as those from Steps 100 to 104 in FIG. 10, the explanation will be omitted.

Subsequently to Step 152, the ECU 60 executes the single-cylinder fuel-rich control (Step 156). Here, the single-cylinder fuel-rich control is as described in Embodiment 3 and is executed over the longer period of the convergence delay period $t_{EGR}$ or the excess temperature time $t_{OT}$.

Subsequently, the ECU 60 changes the target air-fuel ratios of the #1 to #3 cylinders to fuel-rich and then, gradually returns them to the stoichiometric state (Step 158). As described above, the ECU 60 changes the air-fuel ratios of the #1 to #3 cylinders to fuel-rich by the time (correction lag) till the execution of fuel-rich, the degree (correction amount) of the fuel-rich, and time (correction time) for fuel enriching.

According to the routine illustrated in FIG. 20 above, in the execution of the single-cylinder fuel-rich control, the target air-fuel ratios of the #1 to #3 cylinders are switched from fuel-lean to fuel-rich and then, they are controlled so as to gradually return to the stoichiometric side. Therefore, since the step in the air-fuel ratio caused when the EGR gas having passed through path b flows into the surge tank 22 can be made small, deterioration of drivability can be prevented.

In the above-described Embodiment 4, when the ECU 60 executes the processing at Step 158 in FIG. 20, the "other-cylinder enriching means" in the eleventh invention is realized.

The invention claimed is:

1. An internal combustion engine using at least one cylinder in a plurality of cylinders as an EGR exclusive cylinder, comprising:
   an intercooler provided in an intake passage of the internal combustion engine;
   an upstream-side EGR passage which connects an exhaust port of the EGR exclusive cylinder and the intake passage on the upstream of the intercooler; and
   a downstream-side EGR passage which connects the exhaust port of the EGR exclusive cylinder and the intake passage on the downstream of the intercooler, wherein
   lengths of the upstream-side EGR passage and the downstream-side EGR passage are designed such that, assuming that a path from the exhaust port to an intake port of the EGR exclusive cylinder via the upstream-side EGR passage is a first path and a path from the exhaust port to the intake port via the downstream-side EGR passage is a second path, a path difference between the first path and the second path generates a phase difference of 160° to 200° between exhaust gas pulsation via the first path and the exhaust gas pulsation via the second path.

2. The internal combustion engine according to claim 1, wherein
   the path difference is designed on the basis of a phase of the exhaust gas pulsation generated at the highest output revolution number of the internal combustion engine.

3. The internal combustion engine according to claim 1, further comprising:
   a control valve provided in a branch portion branching into the upstream-side EGR passage and the downstream-side EGR passage and capable of changing a ratio between an exhaust gas made to flow through the upstream-side EGR passage and the exhaust gas made to flow through the downstream-side EGR passage by adjusting its opening degree.

4. The internal combustion engine according to claim 3, further comprising:
   engine load determining means for determining whether an engine load exceeds a predetermined high-load determination value or not; and
   target opening-degree adjusting means for adjusting a target opening degree of the control valve so that the ratio of the exhaust gas made to flow through the upstream-side EGR passage side is increased when it is determined that the engine load exceeds the high-load determination value.

5. The internal combustion engine according to claim 4, further comprising:
   cooling-water temperature acquiring means for acquiring a cooling water temperature of the internal combustion engine; and
   cooling-water temperature determining means for determining whether the cooling water temperature is higher than a predetermined excess-determination water temperature or not, wherein
   the target opening-degree adjusting means corrects the target opening degree so that the ratio of the exhaust gas made to flow through the upstream-side EGR passage side is further increased when it is determined that the cooling water temperature is higher than the excess-determination water temperature.

6. The internal combustion engine according to claim 4, further comprising:
   load history acquiring means for acquiring a history of the engine load in a predetermined time;
   excess time estimating means for estimating a cooling-water temperature excess time as time required until the cooling water temperature of the internal combustion engine exceeds a predetermined excess determination water temperature from the current temperature on the basis of the history of the engine load;
   excess time comparing means for comparing a convergence delay period determined in advance as time required for convergence of the opening degree of the control valve and the cooling-water temperature excess time when it is determined that the engine load exceeds the high-load determination value; and
   EGR exclusive cylinder enriching means for enriching a fuel part in an air-fuel ratio of the EGR exclusive cylinder over the convergence delay period when the convergence delay period is longer than the cooling-water temperature excess time and for enriching the fuel part in the air-fuel ratio of the EGR exclusive cylinder over the cooling-water temperature excess time when the cooling-water temperature excess time is longer than the convergence delay period.

7. The internal combustion engine according to claim 4, further comprising:
   an EGR catalyst provided in the upstream-side EGR passage and capable of purifying an exhaust gas;
   bed-temperature acquiring means for acquiring a bed temperature of the EGR catalyst; and
   bed-temperature determining means for determining whether the bed temperature is higher than a predetermined excess determination bed temperature or not, wherein
   the target opening-degree adjusting means corrects the target opening degree so that the ratio of the exhaust gas made to flow through the upstream-side EGR passage side is further increased when it is determined that the bed temperature is higher than the excess determination bed temperature.

8. The internal combustion engine according to claim 4, further comprising:
an EGR catalyst provided in the upstream-side EGR passage and capable of purifying the exhaust gas;
load history acquiring means for acquiring a history of the engine load in a predetermined time;
bed-temperature excess time estimating means for estimating a bed-temperature excess time required until the bed temperature of the EGR catalyst exceeds a predetermined excess determination bed temperature from a current temperature on the basis of the history of the engine load;
excess time comparing means for comparing a convergence delay period determined in advance as time required for convergence of the opening degree of the control valve and the bed temperature excess time when it is determined that the engine load exceeds the high-load determination value; and
EGR exclusive cylinder enriching means for enriching a fuel part in an air-fuel ratio of the EGR exclusive cylinder over the convergence delay period when the convergence delay period is longer than the bed temperature excess time and for enriching the fuel part in the air-fuel ratio of the EGR exclusive cylinder over the bed temperature excess time when the bed temperature excess time is longer than the convergence delay period.

9. The internal combustion engine according to claim 6, or 8 wherein
the EGR exclusive cylinder enriching means enriches the fuel part in the air-fuel ratio in the EGR exclusive cylinder and then, gradually decreases a degree of enriching.

10. The internal combustion engine according to claim 4, further comprising:
other-cylinder enriching means which enriches fuel in an air-fuel ratio of cylinders other than the EGR exclusive cylinder and then, gradually decreases a degree of enriching when it is determined that the engine load exceeds the high-load determination value.

11. The internal combustion engine according to claim 3, further comprising:
an engine load determining unit for determining whether an engine load exceeds a predetermined high-load determination value or not; and
a target opening-degree adjusting unit for adjusting a target opening degree of the control valve so that the ratio of the exhaust gas made to flow through the upstream-side EGR passage side is increased when it is determined that the engine load exceeds the high-load determination value.

12. The internal combustion engine according to claim 11, further comprising:
a cooling-water temperature acquiring unit for acquiring a cooling water temperature of the internal combustion engine; and
a cooling-water temperature determining unit for determining whether the cooling water temperature is higher than a predetermined excess-determination water temperature or not, wherein
the target opening-degree adjusting unit corrects the target opening degree so that the ratio of the exhaust gas made to flow through the upstream-side EGR passage side is further increased when it is determined that the cooling water temperature is higher than the excess-determination water temperature.

13. The internal combustion engine according to claim 11, further comprising:
a load history acquiring unit for acquiring a history of the engine load in a predetermined time;
an excess time estimating unit for estimating a cooling-water temperature excess time as time required until the cooling water temperature of the internal combustion engine exceeds a predetermined excess determination water temperature from the current temperature on the basis of the history of the engine load;
an excess time comparing unit for comparing a convergence delay period determined in advance as time required for convergence of the opening degree of the control valve and the cooling-water temperature excess time when it is determined that the engine load exceeds the high-load determination value; and
an EGR exclusive cylinder enriching unit for enriching a fuel part in an air-fuel ratio of the EGR exclusive cylinder over the convergence delay period when the convergence delay period is longer than the cooling-water temperature excess time and for enriching the fuel part in the air-fuel ratio of the EGR exclusive cylinder over the cooling-water temperature excess time when the cooling-water temperature excess time is longer than the convergence delay period.

14. The internal combustion engine according to claim 11, further comprising:
an EGR catalyst provided in the upstream-side EGR passage and capable of purifying an exhaust gas;
a bed-temperature acquiring unit for acquiring a bed temperature of the EGR catalyst; and
a bed-temperature determining unit for determining whether the bed temperature is higher than a predetermined excess determination bed temperature or not, wherein
the target opening-degree adjusting unit corrects the target opening degree so that the ratio of the exhaust gas made to flow through the upstream-side EGR passage side is further increased when it is determined that the bed temperature is higher than the excess determination bed temperature.

15. The internal combustion engine according to claim 11, further comprising:
an EGR catalyst provided in the upstream-side EGR passage and capable of purifying the exhaust gas;
a load history acquiring unit for acquiring a history of the engine load in a predetermined time;
a bed-temperature excess time estimating unit for estimating a bed-temperature excess time required until the bed temperature of the EGR catalyst exceeds a predetermined excess determination bed temperature from a current temperature on the basis of the history of the engine load;
an excess time comparing unit for comparing a convergence delay period determined in advance as time required for convergence of the opening degree of the control valve and the bed temperature excess time when it is determined that the engine load exceeds the high-load determination value; and
an EGR exclusive cylinder enriching unit for enriching a fuel part in an air-fuel ratio of the EGR exclusive cylinder over the convergence delay period when the convergence delay period is longer than the bed temperature excess time and for enriching the fuel part in the air-fuel ratio of the EGR exclusive cylinder over the bed temperature excess time when the bed temperature excess time is longer than the convergence delay period.

16. The internal combustion engine according to claim 13 or 15, wherein
the EGR exclusive cylinder enriching unit enriches the fuel part in the air-fuel ratio in the EGR exclusive cylinder and then, gradually decreases a degree of enriching.

17. The internal combustion engine according to claim 11, further comprising:
an other-cylinder enriching unit which enriches fuel in an air-fuel ratio of cylinders other than the EGR exclusive cylinder and then, gradually decreases a degree of enriching when it is determined that the engine load exceeds the high-load determination value.

* * * * *